US011261336B2

(12) United States Patent
Mardel et al.

(10) Patent No.: US 11,261,336 B2
(45) Date of Patent: Mar. 1, 2022

(54) PROCESS FOR APPLYING A METAL-ORGANIC FRAMEWORK-CONTAINING CORROSION RESISTANT COATING TO A SUBSTRATE

(71) Applicants: THE BOEING COMPANY, Chicago, IL (US); COMMONWEALTH SCIENTIFIC AND INDUSTRIAL RESEARCH ORGANISATION, Acton (AU)

(72) Inventors: James Ivan Mardel, Acton (AU); Ivan Stewart Cole, Acton (AU); Paul Andrew White, Acton (AU); Anthony Ewart Hughes, Acton (AU); Tracey Anne Markley, Acton (AU); Timothy Graham Harvey, Acton (AU); Joseph Osborne, Seattle, WA (US); Erik Sapper, Ballwin, MO (US)

(73) Assignee: THE BOEING COMPANY, Chicago, IL (US)

( * ) Notice: Subject to any disclaimer, the term of this patent is extended or adjusted under 35 U.S.C. 154(b) by 459 days.

(21) Appl. No.: 16/083,832

(22) PCT Filed: Mar. 10, 2017

(86) PCT No.: PCT/AU2017/050218
§ 371 (c)(1),
(2) Date: Sep. 10, 2018

(87) PCT Pub. No.: WO2017/152240
PCT Pub. Date: Sep. 14, 2017

(65) Prior Publication Data
US 2020/0339824 A1    Oct. 29, 2020

Related U.S. Application Data

(60) Provisional application No. 62/306,818, filed on Mar. 11, 2016.

(51) Int. Cl.
*B05D 7/14* (2006.01)
*B05D 7/24* (2006.01)
*C09D 5/08* (2006.01)
*C09K 15/32* (2006.01)
*C08K 5/56* (2006.01)
*B05D 7/26* (2006.01)

(52) U.S. Cl.
CPC ............ *C09D 5/086* (2013.01); *B05D 7/14* (2013.01); *B05D 7/24* (2013.01); *C09K 15/326* (2013.01); *B05D 7/26* (2013.01); *B05D 2202/00* (2013.01); *B05D 2202/25* (2013.01); *C08K 5/56* (2013.01)

(58) Field of Classification Search
None
See application file for complete search history.

(56) References Cited

U.S. PATENT DOCUMENTS

2010/0178767 A1* 7/2010 Schubert ............. H01L 21/3212
                                                        438/692
2018/0105702 A1* 4/2018 Mardel ................... C23C 22/56

FOREIGN PATENT DOCUMENTS

| CN | 101429209 | A |   | 5/2009 |
| CN | 103403091 | A |   | 11/2013 |
| CN | 104861822 | A | * | 8/2015 |
| CN | 104861822 | A |   | 8/2015 |
| JP | S54123145 | A |   | 9/1979 |
| JP | 2010521582 | A |   | 6/2010 |
| WO | 2004085551 | A1 |   | 10/2004 |
| WO | 2012100224 | A2 |   | 7/2012 |
| WO | 2014151570 | A1 |   | 9/2014 |
| WO | 2016154680 | A1 |   | 10/2016 |

OTHER PUBLICATIONS

Rangelov, S.; Mircheva, V. The Influence of Metal Complexes of Tetramethyldithio-Oxamide on the Rate of Acid Corrosion of Steel. Corrosion Science 1996, 38 (2), 301-306 (Year: 1996).*
Olea, D.; Alexandre, S. S.; Amo-Ochoa, P.; Guijarro, A.; de Jesús, F.; Soler, J. M.; de Pablo, P. J.; Zamora, F.; Gómez-Herrero, J. From Coordination Polymer Macrocrystals to Nanometric Individual Chains. Advanced Materials 2005, 17 (14), 1761-1765. (Year: 2005).*
Khaled, K. F.; Babić-Samardžija, K.; Hackerman, N. Cobalt(III) Complexes of Macrocyclic-Bidentate Type as a New Group of Corrosion Inhibitors for Iron in Perchloric Acid. Corrosion Science 2006, 48 (10), 3014-3034. (Year: 2006).*
Singh, V. P.; Singh, P.; Singh, A. K. Synthesis, Structural and Corrosion Inhibition Studies on Cobalt(II), Nickel(II), Copper(II) and Zinc(II) Complexes with 2-Acetylthiophene Benzoylhydrazone. Inorganica Chimica Acta 2011, 379 (1), 56-63. (Year: 2011).*
Singh, P.; Singh, A. K.; Singh, V. P. Synthesis, Structural and Corrosion Inhibition Properties of Some Transition Metal(II) Complexes with o-Hydroxyacetophenone-2-Thiophenoyl Hydrazone. Polyhedron 2013, 65, 73-81, (Year: 2013).*
European search opinion for EP 3426732 A1, dated Oct. 17, 2019, 3 pages. (Year: 2019).*

(Continued)

*Primary Examiner* — William P Fletcher, III
(74) *Attorney, Agent, or Firm* — Patterson + Sheridan, LLP

(57) ABSTRACT

Processes, compositions and agents are included for inhibiting corrosion in various substrates, for example metal substrates. Corrosion inhibitors include organometallic polymers such as metal-organic frameworks (MOFs), including compositions and processes comprising MOFs for inhibiting corrosion in metal substrates. In some aspects, a method of protecting a substrate from corrosion includes applying a protective composition including a corrosion inhibitor to the surface of a substrate, where the corrosion inhibitor includes a metal organic framework (MOF).

20 Claims, 2 Drawing Sheets

(56) References Cited

OTHER PUBLICATIONS

Korean Office Action for Application No. 10-2018-7029192 dated Feb. 5, 2021.
Yaseen, W. et al., "Utilizing hydrophobic coatings in corrosion protection and anti-icing" Abstracts, 67th Southeast/71st Southwest Joint Regional Meeting of the American Chemical Society, Memphis, TN, US, 2015.
Syamantak, R., et al., "Self-cleaning MOF: realization of extreme water repellence in coordation driven self-assembled nanostructures", Chemical Science, 2016, 7(3), p. 2251-2256w.
Etaiw, S. E. H., et al., "Structure, characterization and inhibition activity of new metal-organic framework", Corrosion Science, 2011, 53(11), p. 3657-3665.
Fouda, A. S. et al., "Metal-Organic Frameworks as Effective Inhibitors for the Corrosion of Low Carbon Steel in Aqueous Media", Elixir International Journal, Corrosion and Dye, 2015, 82, p. 32393-32402.
Etaiw, S. E. H. et al., "Structure, Characterization and Anti-Corrossion Activity of the New Metal-Organic Framework [(Ag)qox)(4-ab)]", Journal of Inorganic and Organometallic Polymers and Materials, 2011, 21(2), p. 327-335.
Fouda, A. E-A. S. et al., "Metal-organic frameworks based on silver (I) and nitrogen donors as new corrosion inhibitors for copper in HCI solution", Journal of Molecular Liquids, 2016, 213, p. 228-234.
Etaiw, S. E. H. et al., "Cluster type molecule as novel corrosion inhibitor for steel in HCI solution", Protection of Metals and Physical Chemistry of Surfaces, 2013, 49(1), p. 113-123.
Liang, W. et al., "The coordination polymer poly [[aqua(u-oxalato) [1H-1,2,4-triazole-5(4H)-thione]cadmium(II)]monohydrate]" Acta Crystallographica, Section D: Structural Chemistry, 2014, 70(2), p. 182-184.
Ghorbani-Kalhor, E. et al., "Determination of mercury (II) ions in seafood samples after extraction and preconcentration by a novel functionalized magnetic metal-organic framework nanocomposite", Journal of Separation Science, 2015, 38(7), p. 1179-1186.
Hao, Z-M. et al., "Luminescent boracite-like metal-organic frameworks constructed by Cu-centered CuCu4 tetrahedra and CuCu3 triangles with an acentric cubic superlarge cell", CrystEngCom, 2010, 1291), p. 55-58.
Liu, J. et al.,"Deposition of metal-Organic Frameworks by Liquid-Phase epitaxy: The Influence of Subtrate Functional Group Density on Film Orientation", Materials, 2012, 5, p. 1581-1592.
Written Opinion and International Search Report—PCT/AU2017/050218—International Search Authority—Australian Patent Office—dated Apr. 10, 2017, 5 pages.
Extended European Search Report for Application No. 17762344.4-1102/3426732 dated Oct. 19, 2017.
D. Olea et al: "From Coordination PolymerMacrocrystals to Nanometric Individual Chains",Advanced Materials, vol. 17, No. 14, Jul. 18, 2005, pp. 1761-1765.
Jingjing Zhao et al: "Unusual 3D pillared-layer Pb(II) complex supported by mercapto-triazole ligand: Synthesis, structure and luminescent property", Inorganic Chemistry Communications, Elsevier, Amsterdam, NL, vol. 20, Mar. 8, 2012 (Mar. 8, 2012), pp. 205-208.
Chinese Office Action for Application No. 201780026046.2 dated Jun. 19, 2020.
Japanese Patent Office Notice of Reasons for Rejection for Application No. 2018-54784 dated Feb. 2, 2021.
Chinese Office Action for Application No. 201780026046.2 dated Mar. 4, 2021.
Japanese Patent Office, Decision of Rejection for Application 2018-547984 dated Sep. 28, 2021.

* cited by examiner

PROCESS FOR APPLYING A METAL-ORGANIC FRAMEWORK-CONTAINING CORROSION RESISTANT COATING TO A SUBSTRATE

CROSS-REFERENCE TO RELATED APPLICATIONS

This application is a National Stage application of PCT/AU2017/050218, filed Mar. 10, 2017, which claims benefit from U.S. Provisional Patent Application No. 62/306,818, filed Mar. 11, 2016, both of which are incorporated by reference in their entirety.

FIELD

The present disclosure relates to processes, compositions and agents for inhibiting corrosion in various substrates, for example metal substrates. The present disclosure also relates to corrosion inhibitors comprising organometallic polymers such as metal-organic frameworks (MOFs), including compositions and processes comprising MOFs for inhibiting corrosion in metal substrates.

BACKGROUND

Protection of substrates, such as metal substrates, against atmospheric corrosion presents a difficult challenge and has significant economic importance. A range of metal substrates requiring protection from corrosion typically include aluminium alloys used in the aerospace industry, ferrous metals, zinc metals and alloys used for protective coatings.

Pigment grade corrosion inhibitors used in organic primers are well known to require anionic species with inhibitor activity that have limited, but effective, solubility in water. For these reasons, chromate based corrosion inhibitor species have been preferred in both corrosion control technologies applied on aluminium for protection against atmospheric corrosion, for example provided in conversion coatings and high performance organic primers. The hexavalent chromate ion has proven to be an excellent corrosion inhibitor for many metals and alloy systems for many decades. However, the toxic and carcinogenic nature of the chromate ion has been understood for some time and there has been extensive research for almost 30 years for finding environmentally acceptable replacements.

It is generally known that if toxicity, efficiency, and price are considered, the number of inorganic corrosion inhibitor species available for chromate replacement is limited essentially to a few anionic species, including molybdates, phosphates, borates, silicates and cyanamides. As a consequence, all commercial non-chromate corrosion inhibitor pigments are molybdates, phosphates, borates, silicates or cyanamides, or combinations of these compounds. In comparison to chromates, inherent limitations of their corrosion preventing mechanism render the anionic species less effective inhibitors of corrosion, in general, and specifically of atmospheric corrosion of aluminium. Alternative inhibitors of atmospheric corrosion are required that could be comparably effective, non-toxic alternative of the hexavalent chromate.

In contrast, a large array of organic corrosion inhibitors have been more recently known and applied in various corrosion control technologies. Excessive solubility in water and/or volatility of most of the known organic inhibitors are limitations when used in conversion coating technologies and in organic coatings.

Considerable progress has been made with identifying alternative corrosion inhibitors and the salts of transition metal and rare earth metals offer possible alternatives for many applications, including deoxidising and pickling solutions, etchants, anodizing and conversion coatings, primer paints and sealants. For example, cerium chloride was found in the early 80's (Hinton et al.) to be an excellent inhibitor for aluminium alloys. Alkali metal salts of carboxylic acids such as cinnamates have also been found to effectively inhibit the corrosion of mild steel.

The combination of rare earth metal ions with an effective organic inhibitor has also been found to suppress both anodic and cathodic reactions (i.e. a mixed inhibitor). For example, Behrouzvaziri et al. (2008) and Blin et al. (2007) have shown with electrochemical studies that lanthanum hydroxy cinnamate provides inhibition of corrosion in chloride solutions. For aluminium alloys, Ho et al. (2006) and Markley et al. (2007) demonstrated that cerium diphenyl phosphate and cerium dibutyl phosphate were very good inhibitors of corrosion of aluminium alloys. For example, U.S. Pat. No. 5,298,148 describes a range of powder coating formulations selected from the group consisting of lanthanum acetate, lanthanum butyrate, lanthanum oxalate, lanthanum nitrate, lanthanum hydroxide, lanthanum oxide, and lanthanum tungstate.

Organic compounds with aromatic character such as carbocyclic and heterocyclic aromatic structures have also been found to be effective inhibitors of corrosion of aluminium and its alloys, and for example, can be provided with metal salts or in the form of a metal complex. For example, WO2004/085551 relates to a corrosion inhibiting coating comprising a rare earth-based organic compound and/or a combination of a rare earth metal and an organic compound for coatings comprising an epoxy primer for the corrosion protection of metals. Most of the known alternative chromate based corrosion inhibitors suffer from various problems including limited corrosion inhibiting activity or incompatibility with various coating compositions.

There is a need for identifying alternative corrosion inhibitors for protecting substrates, for example in metal substrates such as metal alloys, which are chromate-free corrosion inhibitors suitable for use in protective compositions.

SUMMARY

Research was undertaken to identify improved coating compositions and chromate-free corrosion inhibitors for protecting various substrates, such as metal substrates, from corrosion. During this research, it was identified that typical corrosion inhibiting agents, such as organic heterocyclic compounds, could be problematically reactive with other constituents of compositions, such as with resins used in paint compositions. In view of these identified problems, further research was undertaken and it has been surprisingly identified that various organometallic polymers can be effective as corrosion inhibitors while providing advantages of being compatible with a broad range of constituents in the compositions.

In a first aspect, there is provided a method of protecting a substrate from corrosion comprising applying a protective composition comprising a corrosion inhibitor to the surface of a substrate, wherein the corrosion inhibitor comprises a metal organic framework (MOF).

The substrate may be a metal substrate. It will be appreciated that the metal substrate can include any substrate material having at least a portion of its surface being metallic. The metal substrate may comprise any metal requiring protection from corrosion. The metal substrate may be copper-rich alloys, for example copper-rich aluminium alloys.

The MOF may comprise metal ions or metal clusters each coordinated to one or more organic ligands to form a one-, two- or three dimensional network. The MOF may be selected to have a porous three dimensional network.

The one or more organic ligands of the MOF may be selected from optionally substituted aryl, heteroaryl or heterocyclic compounds. The one or more organic ligands may be selected from optionally substituted aryl, heteroaryl or heterocyclic compounds comprising at least two heteroatoms selected from N, O and S. The one or more organic ligands may be selected from optionally substituted aryl, heteroaryl or heterocyclic compounds comprising at least one exocyclic sulphur group. The exocyclic sulphur group may be selected from thiol and thione groups. The organic ligand may be selected from an optionally substituted, optionally fused, 5 or 6-membered mono or bicyclic aryl, heteroaryl or heterocyclic compound comprising at least one exocyclic sulphur group selected from a thiol and thione. The at least one exocyclic sulphur group may be a thiol.

The optionally substituted aryl, heteroaryl or heterocyclic compounds may be unsubstituted or substituted with a group consisting of alkyl, alkenyl, alkynyl, cycloalkyl, cycloalkenyl, aryl, heterocyclyl, heteroaryl, formyl, alkanoyl, cycloalkanoyl, aroyl, heteroaroyl, carboxyl, alkoxycarbonyl, cycloalkyloxycarbonyl, aryloxycarbonyl, heterocyclyloxycarbonyl, heteroaryloxycarbonyl, alkylaminocarbonyl, cycloalkylaminocarbonyl, arylaminocarbonyl, heterocyclylaminocarbonyl, heteroarylaminocarbonyl, cyano, alkoxy, cycloalkoxy, aryloxy, heterocyclyloxy, heteroaryloxy, alkanoate, cycloalkanoate, aryloate, heterocyclyloate, heteroaryloate, alkylcarbonylamino, cycloalkylcarbonylamino, arylcarbonylamino, heterocyclylcarbonylamino, heteroarylcarbonylamino, nitro, alkylthio, cycloalkylthio, arylthio, heterocyclylthio, heteroarylthio, alkylsulfonyl, cycloalkylsulfonyl, arylsulfonyl, heterocyclysulfonyl, heteroarylsulfonyl, hydroxyl, halo, haloalkyl, haloaryl, haloheterocyclyl, haloheteroaryl, haloalkoxy, haloalkylsulfonyl, silylalkyl, alkenylsilylalkyl, alkynylsilylalkyl, amino, thiol and thionyl. The optionally substituted aryl, heteroaryl or heterocyclic compounds may be unsubstituted or substituted with a group consisting of halo, alkyl, formyl, amino, thiol and thione. The optionally substituted aryl, heteroaryl or heterocyclic compounds may be unsubstituted or substituted with a group consisting of amino, thiol and thione.

In an embodiment, the method of protecting a substrate from corrosion comprises applying a protective composition comprising a corrosion inhibitor to the surface of a substrate, wherein the corrosion inhibitor comprises a metal organic framework (MOF), wherein the MOF comprises metal ions or metal clusters each coordinated to one or more organic ligands to form at least a one-, two- or three dimensional network, and wherein the one or more organic ligands are selected from the group consisting of optionally substituted aryl, heteroaryl or heterocyclic compounds, wherein each of the aryl, heteroaryl or heterocyclic compounds comprise at least one exocyclic sulphur group.

In an embodiment, the one or more organic ligands is selected from a compound of Formula 1:

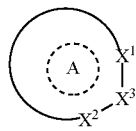

Formula 1 wherein

A is a 5- or 6-membered aryl, heteroaryl or heterocyclic ring, which is optionally substituted with one or more substituents and optionally fused with one or more aryl or heteroaryl rings, wherein the dotted lines represent one or more optional double bonds;

$X^1$ is selected from the group consisting of N, $NR^1$, O, S, $CR^2$ and $CR^3R^4$;

$X^2$ is selected from the group consisting of N, $NR^5$, O, S, $CR^6$ and $CR^7R^8$;

$X^3$ is selected from the group consisting of N, $NR^9$, $CR^1$ and $CR^{11}R^{12}$;

$R^1$, $R^5$ and $R^9$, are each independently selected from the group consisting of hydrogen, amino, $C_1$-$C_{10}$alkyl, $C_2$-$C_{10}$alkenyl, $C_2$-$C_{10}$alkynyl, aryl and heteroaryl, in which each amino, alkyl, alkenyl, alkynyl, aryl or heteroaryl group may be optionally substituted; and $R^2$, $R^3$, $R^4$, $R^6$, $R^7$, $R^8$, $R^{10}$, $R^{11}$ and $R^{12}$, are each independently selected from the group consisting of hydrogen, halo, amino, thiol, thione, $C_1$-$C_{10}$alkyl, $C_2$-$C_{10}$alkenyl, $C_2$-$C_{10}$alkynyl, aryl and heteroaryl, in which each amino, alkyl, alkenyl, alkynyl, aryl or heteroaryl group may be optionally substituted.

In an embodiment, $X^1$ is selected from the group consisting of N, $NR^1$, O, and S.

In an embodiment, $X^1$ may be selected from the group consisting of N, NH and S.

In an embodiment, $X^3$ is selected from the group consisting of N and $CR^{10}$. In an embodiment, $R^{10}$ is selected from the group consisting of thiol and thione. In an embodiment, $X^3$ is C—SH.

In an embodiment, $X^1$ is selected from the group consisting of N, $NR^1$, O, and S;

and $X^3$ is selected from the group consisting of N and $CR^{10}$. In an embodiment, $X^1$ is selected from N, NH and S. In an embodiment, $R^{10}$ is selected from the group consisting of thiol and thione. In an embodiment, $X^3$ is C—SH.

The metal ion or metal clusters of the MOFs may comprise one or more metal ions selected from rare earth, alkali earth and transition metals. The metals may be selected from the group consisting of Zn, La, Pr, Ce, Sm, Eu, Gd, Tb, Dy, Ho, Er, Tm, Yb, Lu, Co, Y, Ca, Sr, Ba, Sc, Zr, and combinations thereof. The metal ions may be selected from the group consisting of Zn, Pr and Ce. The metal ions or metal clusters of the MOFs typically comprise a single type of metal ion in the coordination framework. The metal ions or metal clusters may comprise a mixed metal system in the coordination framework, for example the metal ions or metal clusters may contain two or more different metals.

The MOFs may be formed as solid particles that are suitable for dispersion in compositions. The average diameter of the MOF particles may be in a range of 20 nm to 50 µm, 40 nm to 30 µm, 60 nm to 10 µm, 80 nm to 5 µm, or 100 nm to 1 µm. The average diameter of the MOF particles may be in a range of 100 nm to 1 µm. The MOFs may be selected to have a substantially white colouration.

In a second aspect, there is provided a corrosion inhibiting agent for protecting substrates from corrosion, wherein the corrosion inhibiting agent is a metal organic framework (MOF).

In a third aspect, there is provided use of a metal organic framework (MOF) as a corrosion inhibitor for protecting substrates from corrosion.

In a forth aspect, there is provided a corrosion inhibiting composition for application to a substrate comprising at least one corrosion inhibitor selected from a metal organic framework (MOF).

The corrosion inhibiting composition may comprise a film-forming organic polymer. The composition may be a coating composition. The coating composition may be a powder coating composition, for example a powder coating composition suitable for use in powder coating of various steels. The coating composition may comprise one or more resins, for example epoxy based resins. The coating composition may be a paint composition, for example an epoxy resin based paint composition. The coating composition may be a spray composition. It will be appreciated that the compositions can include one or more additives, such as pigments, fillers and extenders. The MOFs may be selected to have a light or substantially white colouration. The composition may be substantially free of any pigment additives. For example, the composition may comprise less than 1%, less than 0.1%, less than 0.01%, less than 0.001%, and less than 0.0001% of any pigment additives.

In a fifth aspect, there is provided a process for preparing a corrosion inhibiting composition for application to a substrate comprising forming a composition by admixing a film-forming organic polymer and at least one corrosion inhibitor selected from a metal organic framework (MOF).

In a sixth aspect, there is provided a coated substrate comprising a substrate coated with a corrosion inhibiting composition comprising a metal organic framework (MOF). The coated substrate may comprise one or more layers of coatings applied to the substrate before and/or after the coating of the corrosion inhibiting composition.

The corrosion inhibiting composition may be applied as a direct coating to the surface of the substrate. The corrosion inhibiting composition may comprise a film-forming organic polymer. The substrate may be a metal alloy. The coated substrate may be an aerospace component.

It will be appreciated that any one or more of the embodiments as described above for the first aspect may also apply as embodiments to the other aspects described above. For example, the second, third, forth, fifth or sixth aspects may involve a MOF comprising metal ions or metal clusters each coordinated to one or more organic ligands to form at least a one-, two- or three dimensional network, and wherein the one or more organic ligands are selected from the group consisting of optionally substituted aryl, heteroaryl or heterocyclic compounds, wherein each of the aryl, heteroaryl or heterocyclic compounds comprise at least one exocyclic sulphur group.

DETAILED DESCRIPTION

Figure 1:
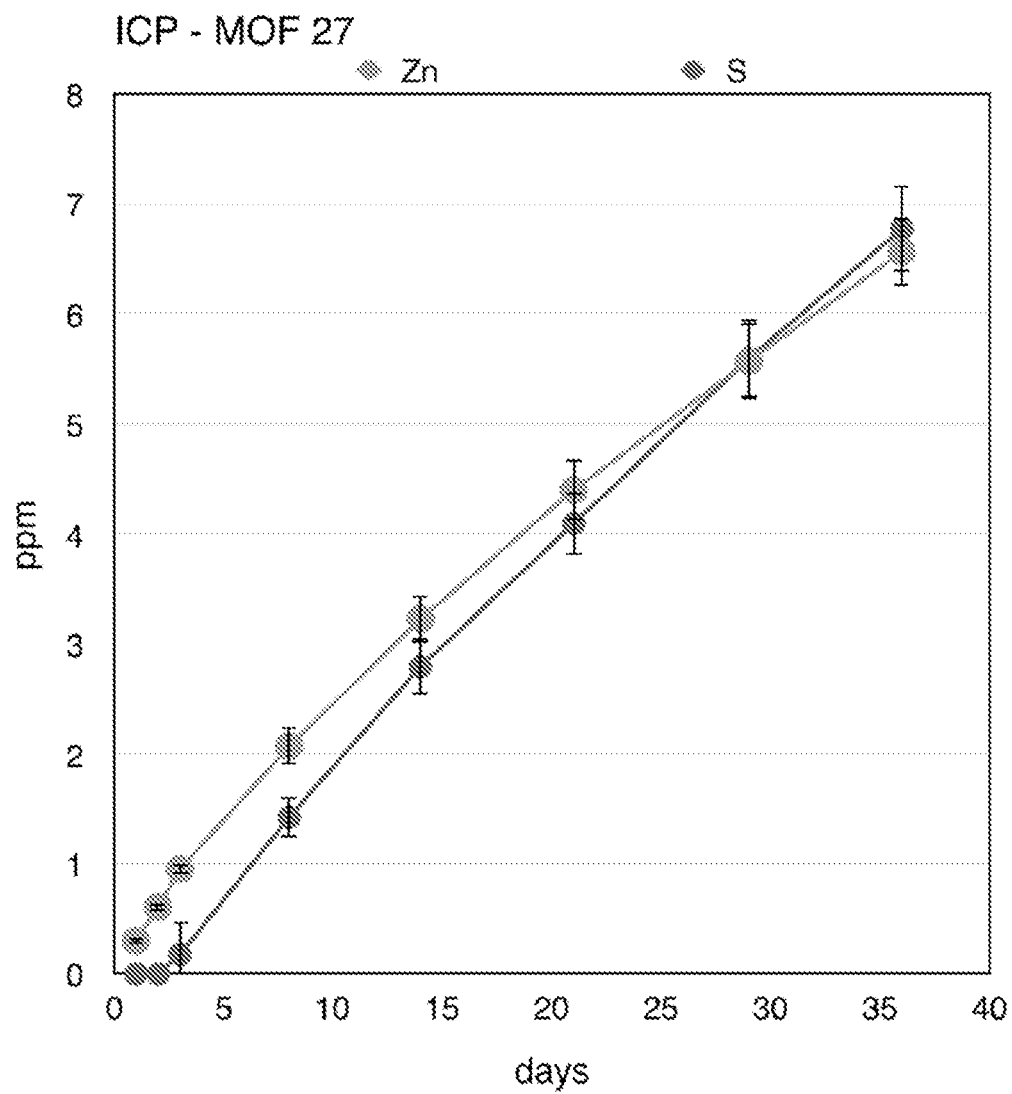
FIG. 1 is a graph illustrating leaching test results of a MOF/epoxy coated metal substrate, according to an embodiment.

The present disclosure describes the following various non-limiting embodiments, which relate to investigations undertaken to identify alternative chromate free corrosion inhibitors. It was surprisingly found that metal organic frameworks (MOFs) were useful as corrosion inhibiting agents, and can be advantageously used in film-forming compositions.

General Terms

As used herein, the term "substrate" refers to any structure that may require protection from corrosion and that can be cleaned and/or protected and/or modified to provide unique properties. The substrate may comprise at least a portion of its surface being metallic or being of any other material susceptible to corrosion. The substrate may be a metal substrate.

As used herein, the term "metal substrate" refers to a structure having at least a portion of its surface being metallic that can be cleaned and/or protected and/or modified to provide unique properties. A "metal substrate" is not limited to any particular type of metallic surface, and in terms of applying a corrosion inhibiting coating, such metal substrates typically include copper-rich alloys, for example copper-rich aluminium alloys.

As used herein, the term "protective composition" refers to any composition suitable for use in providing some form of corrosion protection to a substrate. For example, a protective composition can include a powder coating composition for use in protecting steel from corrosion, or a film-forming organic polymer based composition for protecting an aluminium alloy from corrosion.

As used herein, the term "extender" or "extender pigment" when used without qualification, refers to a type of pigment that is typically incorporated into a paint formulation to provide volume to the final resulting coating after paint curing, although it can be added for other reasons, such as to reduce cost. An extender can additionally or alternatively be an active component in making a total system more corrosion resistant. Extenders which add volume are often referred to as "fillers" or "extenders/fillers."

As used herein, the term "coating" refers to a polymeric material (organic or inorganic) that can be applied either as a liquid (e.g., paint) or solid (e.g., powder) to a substrate to form a polymeric film. Such polymeric materials include, but are not limited to, powder coatings, paints, sealants, conducting polymers, sol gels (e.g. Boegel™ made by Boeing Co. having offices in Chicago, Ill.), silicates, silicones, zirconates, titanates, and the like. A "coating" is comprised of a complex mixture of binders, solvents, pigments and additives. Many coatings have one or more substances from each of the four categories. Coating properties, such as gloss and color, are related to the film surface, i.e., as a two-dimensional entity. However, the bulk properties of a coating are related to its three-dimensional structure. Phase continuity is a volume concept, and the coating performance is dependent on the integrity of the binder phase.

As used herein, the term "film-forming organic polymer" or "film-forming polymeric material" refers to any polymeric material that can be used to make coatings, including monomers, co-monomers, resins or polymers. The polymeric material can also be referred to as a "binder", and can be either organic or inorganic. The organic polymeric material generally has a carbon backbone and the inorganic polymeric material generally has a silicone backbone. Organic binders are made up of organic monomers and oligomers from which the binders generally derive their names. Examples of these would be acrylic, epoxy, urethane, melamine, and so forth. Binders include epoxy-based resin binders such as a water reducible epoxy-polyamide system (for organic polymeric materials) or non-epoxy-based resin binders such as urethanes, ureas, acrylates, alkyds, melamines, polyesters, vinyls, vinyl esters, silicones, siloxanes, silicates, sulfides, silicate polymers, epoxy novolacs, epoxy phenolics, drying oils, hydrocarbon polymers, and the like.

As used herein, the term "weight percent (wt %)" when used without qualification, typically refers to the weight percent of a particular solid component, e.g., pigment, extender, etc., as compared with all solid components present, excluding polymeric resins. For example, if the only solid component present in the coating is a corrosion-inhibiting carbon pigment, the corrosion-inhibiting carbon pigment is considered to have a wt % of 100.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps. The various embodiments disclosed and described in this specification can comprise, consist of, or consist essentially of the features and characteristics as variously described herein. The word "comprise", "comprises", or "comprising" includes those embodiments that "consist of" or "consist essentially of" the features and characteristics as variously described.

Any discussion of documents, acts, materials, devices, articles or the like which has been included in the present specification is solely for the purpose of providing a context for the present disclosure. It is not to be taken as an admission that any or all of these matters form part of the prior art base or were common general knowledge in the field relevant to the present disclosure as it existed before the priority date of each claim of this application.

Chemical Terms

As will be understood, an aromatic group means a cyclic group having 4 m+2 π electrons, where m is an integer equal to or greater than 1. As used herein, "aromatic" is used interchangeably with "aryl" to refer to an aromatic group, regardless of the valency of aromatic group. Thus, aryl refers to monovalent aromatic groups, bivalent aromatic groups and higher multivalency aromatic groups.

The term "joined" refers to a ring, moiety or group that is joined to at least one other ring, moiety or group by a single covalent bond.

The term "fused" refers to one or more rings that share at least two common ring atoms with one or more other rings.

A heteroaromatic group is an aromatic group or ring containing one or more heteroatoms, such as N, O, S, Se, Si or P. As used herein, "heteroaromatic" is used interchangeably with "heteroaryl", and a heteroaryl group refers to monovalent aromatic groups, bivalent aromatic groups and higher multivalency aromatic groups containing one or more heteroatoms.

The term "optionally substituted" means that a functional group is either substituted or unsubstituted, at any available position. It will be appreciated that "unsubstituted" refers to a hydrogen group. Substitution can be with one or more functional groups selected from, e.g., alkyl, alkenyl, alkynyl, cycloalkyl, cycloalkenyl, aryl, heterocyclyl, heteroaryl, formyl, alkanoyl, cycloalkanoyl, aroyl, heteroaroyl, carboxyl, alkoxycarbonyl, cycloalkyloxycarbonyl, aryloxycarbonyl, heterocyclyloxycarbonyl, heteroaryloxycarbonyl, alkylaminocarbonyl, cycloalkylaminocarbonyl, arylaminocarbonyl, heterocyclylaminocarbonyl, heteroarylaminocarbonyl, cyano, alkoxy, cycloalkoxy, aryloxy, heterocyclyloxy, heteroaryloxy, alkanoate, cycloalkanoate, aryloate, heterocyclyloate, heteroaryloate, alkylcarbonylamino, cycloalkylcarbonylamino, arylcarbonylamino, heterocyclylcarbonylamino, heteroarylcarbonylamino, nitro, alkylthio, cycloalkylthio, arylthio, heterocyclylthio, heteroarylthio, alkylsulfonyl, cycloalkylsulfonyl, arylsulfonyl, heterocyclysulfonyl, heteroarylsulfonyl, hydroxyl, halo, haloalkyl, haloaryl, haloheterocyclyl, haloheteroaryl, haloalkoxy, haloalkylsulfonyl, silylalkyl, alkenylsilylalkyl, alkynylsilylalkyl, amino, thiol and thionyl. In an embodiment, the optional substitution may be one or more functional groups selected from halo, alkyl, formyl, amino, thiol and thione. The optional substituents may include salts of the functional groups, for example carboxylate salts. In another embodiment, the optional substitution may be one or more functional groups selected from amino, thiol and thione. It will be appreciated that other groups not specifically described may also be used.

"Alkyl" whether used alone, or in compound words such as alkoxy, alkylthio, alkylamino, dialkylamino or haloalkyl, represents straight or branched chain hydrocarbons ranging in size from one to about 10 carbon atoms, or more. Thus alkyl moieties include, unless explicitly limited to smaller groups, moieties ranging in size, for example, from one to about 6 carbon atoms or greater, such as, methyl, ethyl, n-propyl, iso-propyl and/or butyl, pentyl, hexyl, and higher isomers, including, e.g., those straight or branched chain hydrocarbons ranging in size from about 6 to about 10 carbon atoms, or greater.

"Alkenyl" whether used alone, or in compound words such as alkenyloxy or haloalkenyl, represents straight or branched chain hydrocarbons containing at least one carbon-carbon double bond, including, unless explicitly limited to smaller groups, moieties ranging in size from two to about 6 carbon atoms or greater, such as, methylene, ethylene, 1-propenyl, 2-propenyl, and/or butenyl, pentenyl, hexenyl, and higher isomers, including, e.g., those straight or branched chain hydrocarbons ranging in size, for example, from about 6 to about 10 carbon atoms, or greater.

"Alkynyl" whether used alone, or in compound words such as alkynyloxy, represents straight or branched chain hydrocarbons containing at least one carbon-carbon triple bond, including, unless explicitly limited to smaller groups, moieties ranging in size from, e.g., two to about 6 carbon atoms or greater, such as, ethynyl, 1-propynyl, 2-propynyl, and/or butynyl, pentynyl, hexynyl, and higher isomers, including, e.g., those straight or branched chain hydrocarbons ranging in size from, e.g., about 6 to about 10 carbon atoms, or greater.

"Cycloalkyl" represents a mono- or polycarbocyclic ring system of varying sizes, e.g., from about 3 to about 10 carbon atoms, e.g., cyclopropyl, cyclobutyl, cyclopentyl, cyclohexyl or cycloheptyl. The term cycloalkyloxy represents the same groups linked through an oxygen atom such as cyclopentyloxy and cyclohexyloxy. The term cycloalkylthio represents the same groups linked through a sulfur atom such as cyclopentylthio and cyclohexylthio.

"Cycloalkenyl" represents a non-aromatic mono- or polycarbocyclic ring system, e.g., of about 3 to about 10 carbon atoms containing at least one carbon-carbon double bond, e.g., cyclopentenyl, cyclohexenyl or cycloheptenyl. The term "cycloalkenyloxy" represents the same groups linked through an oxygen atom such as cyclopentenyloxy and cyclohexenyloxy. The term "cycloalkenylthio" represents the same groups linked through a sulfur atom such as cyclopentenylthio and cyclohexenylthio.

The terms, "carbocyclic" and "carbocyclyl" represent a ring system wherein the ring atoms are all carbon atoms, e.g., of about 3 to about 10 carbon atoms, and which may be aromatic, non-aromatic, saturated, or unsaturated, and may be substituted and/or carry fused rings. Examples of such groups include benzene, cyclopentyl, cyclohexyl, or fully or partially hydrogenated phenyl, naphthyl and fluorenyl.

"Aryl" whether used alone, or in compound words such as arylalkyl, aryloxy or arylthio, represents: (i) an optionally substituted mono- or polycyclic aromatic carbocyclic moiety, e.g., of about 6 to about 60 carbon atoms, such as phenyl, naphthyl or fluorenyl; or, (ii) an optionally substituted partially saturated polycyclic carbocyclic aromatic ring system in which an aryl and a cycloalkyl or cycloalkenyl group are fused together to form a cyclic structure such as a tetrahydronaphthyl, indenyl, indanyl or fluorene ring.

"Heterocyclyl" or "heterocyclic" whether used alone, or in compound words such as heterocyclyloxy represents: (i) an optionally substituted cycloalkyl or cycloalkenyl group, e.g., of about 3 to about 60 ring members, which may contain one or more heteroatoms such as nitrogen, oxygen, or sulfur (examples include pyrrolidinyl, morpholino, thiomorpholino, or fully or partially hydrogenated thienyl, furyl, pyrrolyl, thiazolyl, oxazolyl, oxazinyl, thiazinyl, pyridyl and azepinyl); (ii) an optionally substituted partially saturated polycyclic ring system in which an aryl (or heteroaryl) ring and a heterocyclic group are fused together to form a cyclic structure (examples include chromanyl, dihydrobenzofuryl and indolinyl); or (iii) an optionally substituted fully or partially saturated polycyclic fused ring system that has one or more bridges (examples include quinuclidinyl and dihydro-1,4-epoxynaphthyl).

"Heteroaryl" or "hetaryl" whether used alone, or in compound words such as heteroaryloxy represents: (i) an optionally substituted mono- or polycyclic aromatic organic moiety, e.g., of about 1 to about 10 ring members in which one or more of the ring members is/are element(s) other than carbon, for example nitrogen, oxygen, sulfur or silicon; the heteroatom(s) interrupting a carbocyclic ring structure and having a sufficient number of delocalized pi electrons to provide aromatic character, provided that the rings do not contain adjacent oxygen and/or sulfur atoms. Typical 6-membered heteroaryl groups are pyrazinyl, pyridazinyl, pyrazolyl, pyridyl and pyrimidinyl. All regioisomers are contemplated, e.g., 2-pyridyl, 3-pyridyl and 4-pyridyl. Typical 5-membered heteroaryl rings are furyl, imidazolyl, oxazolyl, isoxazolyl, isothiazolyl, oxadiazolyl, pyrrolyl, 1,3,4-thiadiazolyl, thiazolyl, thienyl, triazolyl, and silole. All regioisomers are contemplated, e.g., 2-thienyl and 3-thienyl. Bicyclic groups typically are benzo-fused ring systems derived from the heteroaryl groups named above, e.g., benzofuryl, benzimidazolyl, benzthiazolyl, indolyl, indolizinyl, isoquinolyl, quinazolinyl, quinolyl and benzothienyl; or, (ii) an optionally substituted partially saturated polycyclic heteroaryl ring system in which a heteroaryl and a cycloalkyl or cycloalkenyl group are fused together to form a cyclic structure such as a tetrahydroquinolyl or pyrindinyl ring.

"Formyl" represents a —CHO moiety.

"Alkanoyl" represents a —C(=O)-alkyl group in which the alkyl group is as defined supra. In one embodiment, an alkanoyl ranges in size from about $C_2$-$C_{20}$. One example is acyl.

"Aroyl" represents a —C(=O)-aryl group in which the aryl group is as defined supra. In one embodiment, an aroyl ranges in size from about $C_7$-$C_{20}$. Examples include benzoyl and 1-naphthoyl and 2-naphthoyl.

"Heterocycloyl" represents a —C(=O)-heterocyclyl group in which the heterocylic group is as defined supra. In one embodiment, an heterocycloyl ranges in size from about $C_4$-$C_{20}$.

"Heteroaroyl" represents a —C(=O)-heteroaryl group in which the heteroaryl group is as defined supra. In one embodiment, a heteroaroyl ranges in size from about $C_6$-$C_{20}$. An example is pyridylcarbonyl.

"Carboxyl" represents a —$CO_2$H moiety.

"Oxycarbonyl" represents a carboxylic acid ester group —$CO_2$R.

"Alkoxycarbonyl" represents an —$CO_2$-alkyl group in which the alkyl group is as defined supra. In one embodiment, an alkoxycarbonyl ranges in size from about $C_2$-$C_{20}$. Examples include methoxycarbonyl and ethoxycarbonyl.

"Aryloxycarbonyl" represents an —$CO_2$-aryl group in which the aryl group is as defined supra. Examples include phenoxycarbonyl and naphthoxycarbonyl.

"Heterocyclyloxycarbonyl" represents a —$CO_2$-heterocyclyl group in which the heterocyclic group is as defined supra.

"Heteroaryloxycarbonyl" represents a —CO-heteroaryl group in which the heteroaryl group is as defined supra.

"Aminocarbonyl" represents a carboxylic acid amide group —C(=O)NHR or —C(=O)$NR_2$.

"Alkylaminocarbonyl" represents a —C(=O)NHR or —C(=O)$NR_2$ group in which R is an alkyl group as defined supra.

"Arylaminocarbonyl" represents a —C(=O)NHR or —C(=O)$NR_2$ group in which R is an aryl group as defined supra.

"Heterocyclylaminocarbonyl" represents a —C(=O)NHR or —C(=O)$NR_2$ group in which R is a heterocyclic group as defined supra. In certain embodiments, $NR_2$ is a heterocyclic ring, which is optionally substituted.

"Heteroarylaminocarbonyl" represents a —C(=O)NHR or —C(=O)$NR_2$ group in which R is a heteroaryl group as defined supra. In certain embodiments, $NR_2$ is a heteroaryl ring, which is optionally substituted.

"Cyano" represents a —CN moiety.

"Hydroxyl" represents a —OH moiety.

"Alkoxy" represents an —O-alkyl group in which the alkyl group is as defined supra. Examples include methoxy, ethoxy, n-propoxy, iso-propoxy, and the different butoxy, pentoxy, hexyloxy and higher isomers.

"Aryloxy" represents an —O-aryl group in which the aryl group is as defined supra. Examples include, without limitation, phenoxy and naphthoxy.

"Alkenyloxy" represents an —O-alkenyl group in which the alkenyl group is as defined supra. An example is allyloxy.

"Heterocyclyloxy" represents an —O-heterocyclyl group in which the heterocyclic group is as defined supra.

"Heteroaryloxy" represents an —O-heteroaryl group in which the heteroaryl group is as defined supra. An example is pyridyloxy.

"Alkanoate" represents an —OC(=O)—R group in which R is an alkyl group as defined supra.

"Aryloate" represents a —OC(=O)—R group in which R is an aryl group as defined supra.

"Heterocyclyloate" represents an —OC(=O)—R group in which R is a heterocyclic group as defined supra.

"Heteroaryloate" represents an —OC(=O)—R group in which P is a heteroaryl group as defined supra.

"Amino" represents an —NH$_2$ moiety.

"Alkylamino" represents an —NHR or —NR$_2$ group in which R is an alkyl group as defined supra. Examples include, without limitation, methylamino, ethylamino, n-propylamino, isopropylamino, and the different butylamino, pentylamino, hexylamino and higher isomers.

"Arylamino" represents an —NHR or —NR$_2$ group in which R is an aryl group as defined supra. An example is phenylamino.

"Heterocyclylamino" represents an —NHR or —NR$_2$ group in which R is a heterocyclic group as defined supra. In certain embodiments, NR$_2$ is a heterocyclic ring, which is optionally substituted.

"Heteroarylamino" represents a —NHR or —NR$_2$ group in which R is a heteroaryl group as defined supra. In certain embodiments, NR$_2$ is a heteroaryl ring, which is optionally substituted.

"Carbonylamino" represents a carboxylic acid amide group —NHC(=O)R that is linked to the rest of the molecule through a nitrogen atom.

"Alkylcarbonylamino" represents a —NHC(=O)R group in which R is an alkyl group as defined supra.

"Arylcarbonylamino" represents an —NHC(=O)R group in which R is an aryl group as defined supra.

"Heterocyclylcarbonylamino" represents an —NHC(=O)R group in which R is a heterocyclic group as defined supra.

"Heteroarylcarbonylamino" represents an —NHC(=O)R group in which R is a heteroaryl group as defined supra.

"Nitro" represents a —NO$_2$ moiety.

"Alkylthio" represents an —S-alkyl group in which the alkyl group is as defined supra. Examples include, without limitation, methylthio, ethylthio, n-propylthio, iso propylthio, and the different butylthio, pentylthio, hexylthio and higher isomers.

"Arylthio" represents an —S-aryl group in which the aryl group is as defined supra. Examples include phenylthio and naphthylthio.

"Heterocyclylthio" represents an —S-heterocyclyl group in which the heterocyclic group is as defined supra.

"Heteroarylthio" represents an —S-heteroaryl group in which the heteroaryl group is as defined supra.

"Sulfonyl" represents an —SO$_2$R group that is linked to the rest of the molecule through a sulfur atom.

"Alkylsulfonyl" represents an —SO$_2$-alkyl group in which the alkyl group is as defined supra.

"Arylsulfonyl" represents an —SO$_2$-aryl group in which the aryl group is as defined supra.

"Heterocyclylsulfonyl" represents an —SO$_2$-heterocyclyl group in which the heterocyclic group is as defined supra.

"Heteoarylsulfonyl" presents an —SO$_2$-heteroaryl group in which the heteroaryl group is as defined supra.

"Aldehyde" represents a —C(=O)H group.

"Alkanal" represents an alkyl-(C=O)H group in which the alkyl group is as defined supra.

"Alkylsilyl" represents an alkyl group that is linked to the rest of the molecule through the silicon atom, which may be substituted with up to three independently selected alkyl groups in which each alkyl group is as defined supra.

"Alkenylsilyl" presents an alkenyl group that is linked to the rest of the molecule through the silicon atom, which may be substituted with up to three independently selected alkenyl groups in which each alkenyl group is as defined supra.

"Alkynylsilyl" presents an alkynyl group that is linked to the rest of the molecule through the silicon atom, which may be substituted with up to three independently selected alkynyl groups in which each alkenyl group is as defined supra.

The term "halo" or "halogen" whether employed alone or in compound words such as haloalkyl, haloalkoxy or haloalkylsulfonyl, represents fluorine, chlorine, bromine or iodine. Further, when used in compound words such as haloalkyl, haloalkoxy or haloalkylsulfonyl, the alkyl may be partially halogenated or fully substituted with halogen atoms which may be independently the same or different.

Examples of haloalkyl include, without limitation, —CH$_2$CH$_2$F, —CF$_2$CF$_3$ and —CH$_2$CHFCl. Examples of haloalkoxy include, without limitation, —OCHF$_2$, —OCF$_3$, —OCH$_2$CCl$_3$, —OCH$_2$CF$_3$ and —OCH$_2$CH$_2$CF$_3$. Examples of haloalkylsulfonyl include, without limitation, —SO$_2$CF$_3$, —SO$_2$CCl$_3$, —SO$_2$CH$_2$CF$_3$ and —SO$_2$CF$_2$CF$_3$.

The terms "thiol", "thio", "mercapto" or "mercaptan" refer to any organosulphur group containing a sulphurhydryl moiety —SH, which includes a R—SH group where R is a moiety containing a carbon atom for covalently bonding to the —SH moiety, for example an alkylsulphur group as defined supra. In one embodiment, the thiol or mercapto group is a sulphurhydryl moiety —SH.

The terms "thione", "thioketones" or "thiocarbonyls" refer to any organosulphur group containing a —C=S moiety, which includes a R—C=S group, for example where R is an alky group defined supra. In one embodiment, the thione group is a —C=S moiety.

Metal Organic Frameworks

Metal organic frameworks (MOFs) have been surprisingly identified as effective corrosion inhibitors for substrates, for example metal substrates, and can be used in protective coating compositions without being problematically reactive with other components in the compositions, for example epoxy resin based compositions. Surprisingly, MOFs can be used as corrosion inhibitors in resin based paint compositions to provide protective coatings for metal substrates such as aluminium alloys. It will be appreciated that various types of MOFs have been previously investigated and used for other types of applications, such as hydrogen storage and catalysis, although it is understood that MOFs have never previously been used or considered suitable as corrosion inhibitors.

In an embodiment, the substrate is a metal substrate. It will be appreciated that the metal substrate can include any substrate material having at least a portion of its surface being metallic. The metal substrate may comprise any metal requiring protection from corrosion. In one embodiment, the metal substrate comprises a metal or alloy selected from aluminium, for example aluminium alloys. In one embodiment, the metal substrate is an aluminium alloy, for example alloys of aluminium with one or more metals selected from the group consisting of copper, magnesium, manganese, silicon, tin and zinc. The aluminium alloys may be an alloy comprising copper. In one embodiment, the metal substrate may be a copper-rich alloy, such as a copper-rich aluminium alloy. The aluminium alloy may be an aerospace alloy, for example AA2XXX and AA7XXX type. The aluminium alloy may be an automotive alloy, for example AA6XXX type. The aluminium alloy may be a marine alloy, for example AA5XXX type.

It will also be appreciated that MOFs are one-, two- or three-dimensional structures provided by an organometallic polymeric framework comprising a plurality of metal ions or metal clusters each coordinated to one or more organic ligands. MOFs may provide porous structures comprising a plurality of pores. The MOFs may be crystalline or amorphous, for example it will be appreciated that one-, two- or three-dimensional MOF structures may be amorphous or crystalline. It will be appreciated that metal clusters include two or more metal ions linked in part by metal-metal bonds. It will also be appreciated that one dimensional structures include, for example, a linear structure of metal atoms linked by organic ligands. It will be appreciated that two dimensional structures include, for example, a sheet or layer structure having length and width (e.g. area) dimensions of metal atoms linked by organic ligands. It will also be appreciated that three dimensional structures include, for example, a sphere or cube structure having length, width and height (e.g. volume) dimensions of metal atoms linked by organic ligands. The one-, two- or three-dimensional MOF structures may be at least partially amorphous or at least partially crystalline, for example a MOF having regions of order providing a degree of crystallinity and regions of disorder providing amorphous properties. In one embodiment, the MOFs provided are two-dimensional and/or three-dimensional structures. In one embodiment, the MOFs are crystalline, and may for example comprise an appropriate amount of homogeneity. In another embodiment, the MOFs are amorphous, for example as described in the article entitled "Amorphous Metal-Organic Frameworks", Bennett et al, Accounts of Chemical Research, ACS publications, published 7 Apr. 2014. It will be appreciated that crystalline MOFs are porous frameworks comprising an infinite array of metal nodes connected by organic linkers. Amorphous MOFs still retain the basic building blocks and connectivity of their crystalline counterparts, though they lack any long-range periodic order.

The organic ligands of the MOFs are typically selected from heterocyclic compounds, which may be optionally substituted and optionally fused with one or more substituents or groups. It will be appreciated that the metal organic frameworks can incorporate other ligands with the metals or metal clusters in addition to the organic ligands, for example anions such as acetate or halides may provide additional ligands, and for example may originate from metal salts used to form the MOFs.

In another embodiment, MOFs comprise a plurality of metal ions or metal clusters each coordinated to one or more organic ligands, wherein:

the metal ions or metal clusters comprise one or more metals selected from alkali earth metals, rare earth metals and transition metals; and the organic ligand is selected from an optionally substituted, optionally fused, aryl, heteroaryl or heterocyclic compound.

The one or more organic ligands of the MOF may be selected from optionally substituted aryl, heteroaryl or heterocyclic compounds. In an embodiment, the one or more organic ligands are selected from optionally substituted aryl, heteroaryl or heterocyclic compounds comprising at least two heteroatoms selected from N, O and S. In another embodiment, the one or more organic ligands are selected from optionally substituted aryl, heteroaryl or heterocyclic compounds comprising at least one exocyclic sulphur group. The exocyclic sulphur group may be selected from thiol and thione groups. In another embodiment, the organic ligand is selected from an optionally substituted, optionally fused, 5 or 6-membered mono or bicyclic aryl, heteroaryl or heterocyclic compound comprising at least one exocyclic sulphur group selected from a thiol and thione. In another embodiment, the at least one exocyclic sulphur group is a thiol.

A range of different types of MOFs may be suitable as corrosion inhibitors. MOFs may also be referred to as porous coordination polymers (PCPs). A range of MOFs are described in the Chemical Reviews article by A Betard and R Fischer entitled "Metal-Organic Framework Thin Films: From Fundamentals to Applications" (2012) and Yaghi et al, Acc. Chem. Res. 2001, 34,319-330. For example, suitable MOFs can be selected from those with zeolite-net-like topologies, namely zeolite-net-like metal-organic frameworks (ZMOFs). In an embodiment, the MOFs are a zeolitic imidazolate frameworks (ZIFs). The MOFs may have isoreticular expansion on frameworks. The MOFs may utilize single metal ion based molecular building blocks (MBBs) with coordination including chelation (and heterochelation) and bridging from organic heterocyclic ligands, which contain coordination and bridging functionality, and which may together form secondary building units (SBUs). A plurality of SBUs together forms the metal organic framework, which can provide three-dimensional porous structures with substantially uniform channels and cages. The MOFs are typically formed as solidified particles from reactions involving metal salts, organic ligands and suitable solvents, as described further below.

In one embodiment, a metal-ligand directed assembly approach can be used to form MOFs with rigid secondary building units (SBUs), such as rigid tetrahedral SBUs. Properties such as pore size for the MOFs can be modified by selection of suitable reagents, for example selection of various metal salts to include different metal cations and counter anions, different organic heterocyclic ligands, solvents and structure directing agents (SDAs).

In another embodiment, the MOFs comprise a plurality of molecular building blocks (MBB) each having a metal cluster that together with one or more organic ligands forms secondary building units (SBU) that are each connected together into a network. It will be appreciated that the configuration and connection of SBUs into a framework are described by topologies that are also called a "net", which are commonly assigned three letter symbols (e.g. "pcu net") as provided in the database of Reticular Chemistry Structure Resource. The MOFs may be based on single metals as vertices in the framework.

MOFs may also be formed by seeding with agents. For example, silicon and titania nanoparticles or microspheres may be used as seeding agents. Methods of forming MOFs using seeding or crystallisation agents are described in WO2011/133999 (PCT/AU2010/001056).

MOFs may also be formed by flow chemistry processes, for example as described in the article entitled "Versatile, High Quality and Scalable Continuous Flow Production of Metal-Organic Frameworks", Rubio-Martinez et al, Scientific Reports, published online 25 Jun. 2014.

The MOFs may be modified by post-synthetic process. For example, formation of mixed metal or alternative guest molecules. MOFs may also be formed and then modified using ligand exchange processes. Methods of forming MOFs using ligand exchange processes are described in the article titled "Postsynthetic ligand exchange for the synthesis of benzotriazole-containing zeolitic imidazolate framework", Jiang et al, Chem. Commun, published online 2 Mar. 2015.

The MOFs can be formed as solid particles that are suitable for dispersion in compositions. In an embodiment, the average diameter of the MOF particles is in a range of 20 nm to 50 µm, 40 nm to 30 µm, 60 nm to 10 µm, 80 nm to 5 μm, or 100 nm to 1 μm. In one embodiment, the average diameter of the MOF particles is in a range of 100 nm to 1 nm.

Metals and Metal Salts Used for MOFs

The metals or metal clusters of the MOFs typically comprise one or more metals selected from rare earth and transition metals. In one embodiment, the metals are selected from alkali earth metals, transition metals and rare earth metals, for example a group consisting of Zn, La, Pr, Ce, Sm, Eu, Gd, Tb, Dy, Ho, Er, Tm, Yb, Lu, Co, Y, Bi, Cd, Pb, Ag, Sb, Sn, Cu, Fe, Ni, Li, Ca, Sr, Mg, Zr, Nd, Ba, Sc, and combinations thereof. In another embodiment, the metals are selected from Zn, Pr and Ce. The metals or metal clusters of the MOFs typically comprise a single type of metal in the coordination framework. In another embodiment, the metal or metal clusters may comprise a mixed metal system in the coordination framework, for example the metals or metal clusters may contain two different metals.

Some specific examples of metal salts suitable for use for MOFs are nitrate, chloride and acetate salts of the above described metals.

Organic Ligands

The MOFs can comprise organic ligands that are selected from optionally substituted aryl, heteroaryl, or heterocyclic compounds.

The organic ligand may be a mono or polyvalent ligand capable of coordinating or chelating to a metal atom of the MOF. For example the organic ligand may be a mono, di, tri, tetra-, penta-, or hexavalent ligand. In one embodiment, the organic ligand can chelate or coordinate to two separate metal atoms of the MOF and therefore provide a bridge or link between metal atoms in the metal organic framework. For the secondary building units of the MOFs, the ratio of organic ligand:metal atom may vary, for example the ratio may be 3:1 respectively (e.g. where three separate bidentate organic ligands coordinate to a metal atom to form a 6 coordinate metal complex as the secondary building unit). The ratio of organic ligand:metal may vary, for example the ratios may be 2:1, 3:1, 4:1, 5:1: or 6:1, respectively depending on the metal atom and organic ligand for the metal complex forming the SBU.

The one or more organic ligands of the MOFs may be selected from optionally substituted aryl, heteroaryl or heterocyclic compounds. In an embodiment, the one or more organic ligands are selected from optionally substituted aryl, heteroaryl or heterocyclic compounds comprising at least two heteroatoms selected from N, O and S. In another embodiment, the one or more organic ligands are selected from optionally substituted aryl, heteroaryl or heterocyclic compounds comprising at least one exocyclic sulphur group. The exocyclic sulphur group may be selected from thiol and thione groups. In another embodiment, the organic ligand is selected from an optionally substituted, optionally fused, 5 or 6-membered mono or bicyclic aryl, heteroaryl or heterocyclic compound comprising at least one exocyclic sulphur group selected from a thiol and thione. In another embodiment, the at least one exocyclic sulphur group is a thiol.

For example, the organic ligands used in the MOFs may be selected from ligands individually capable of providing corrosion inhibiting properties, such as described in the article entitled "The effect of inhibitor structure on the corrosion of AA2024 and AA7075", Harvey et al. Corrosion Science, 53 (2011), pp 2184-2190.

In another embodiment, the one or more organic ligands are selected from a compound of Formula 1:

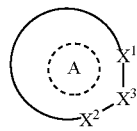

Formula 1 wherein

A is a 5- or 6-membered aryl, heteroaryl or heterocyclic ring, which is optionally substituted with one or more substituents and optionally fused with one or more aryl or heteroaryl rings, wherein the dotted lines represents one or more optional double bonds;

$X^1$ is selected from the group consisting of N, $NR^1$, O, S, $CR^2$ and $CR^3R^4$;

$X^2$ is selected from the group consisting of N, $NR^5$, O, S, $CR^6$ and $CR^7R^8$;

$X^3$ is selected from the group consisting of N, $NR^9$, $CR^{10}$ and $CR^{11}R^{12}$;

$R^1$, $R^5$ and $R^9$, are each independently selected from the group consisting of hydrogen, amino, $C_1$-$C_{10}$alkyl, $C_2$-$C_{10}$alkenyl, $C_2$-$C_{10}$alkynyl, aryl and heteroaryl, in which each amino, alkyl, alkenyl, alkynyl, aryl or heteroaryl group may be optionally substituted; and $R^2$, $R^3$, $R^4$, $R^6$, $R^7$, $R^8$, $R^{10}$, $R^{11}$ and $R^{12}$, are each independently selected from the group consisting of hydrogen, halo, amino, thiol, thione, $C_1$-$C_{10}$alkyl, $C_2$-$C_{10}$alkenyl, $C_2$-$C_{10}$alkynyl, aryl and heteroaryl, in which each amino, alkyl, alkenyl, alkynyl, aryl or heteroaryl group may be optionally substituted.

In an embodiment, $X^1$ is selected from the group consisting of N, $NR^1$, O, and S.

In another embodiment, $X^1$ is selected from the group consisting of N, NH and S. In another embodiment, $X^1$ is N.

In an embodiment, $X^3$ is selected from the group consisting of N and $CR^{10}$. In another embodiment, $R^{10}$ is selected from the group consisting of thiol and thione. In another embodiment, $X^3$ is C—SH.

In an embodiment, $X^2$ is selected from the group consisting of N, $NR^5$, O, and S.

In another embodiment, $R^5$ is selected from the group consisting of hydrogen and amino. In another embodiment, $X^2$ is selected from the group consisting of N, S and N—$NH_2$. In another embodiment, $X^2$ is N.

In an embodiment, X is selected from the group consisting of N, $NR^1$, O, and S; $X^2$ is selected from the group consisting of N, $NR^5$, O, and S; and $X^3$ is selected from the group consisting of N and $CR^0$. In another embodiment, $X^1$ is selected from the group consisting of N, NH and S. In another embodiment, $R^{10}$ is selected from the group consisting of thiol and thione. In another embodiment, $X^3$ is C—SH.

In another embodiment, X is N. In another embodiment, $X^2$ is N. In another embodiment, $X^3$ is C—SH.

Optionally fused groups of ring A may be monocyclic or polycyclic. Optional fused groups of the A ring may be optionally substituted mono- or bicyclic aryl, heteroaryl or heterocyclic ring, for example where a compound of Formula 1 is a bicyclic compound. The monocyclic aryl groups may be an optionally substituted 6 membered ring, such as benzene. The polycyclic aryl groups may be two or more optionally substituted 6-member rings fused together, such as naphthalene, anthracene, pyrene, tetracene, and pentacene. The heteroaryl groups may be selected from 5-membered monocyclic rings, such as thiophene, furan, pyrrole, silole, imidazole, 1,3-thiazole, 1,3,4-oxadiazole, 1,3,4-thiadiazole, or 6 membered rings, such as pyridine and triazine, wherein each ring may be optionally substituted.

Optional substituents of ring A ring may be selected from halo, cyano, amino, hydroxy, alkanoic acid, alkanoate salt, carbamoyl, $C_1$-$C_{10}$alkyloxycarbonyl, $C_1$-$C_{10}$alkyl, $C_1$-$C_{10}$haloalkyl, $C_1$-$C_{10}$alkylamino, $C_3$-$C_{10}$cycloalkyl, $C_2$-$C_{10}$alkenyl, $C_3$-$C_{10}$cycloalkenyl, $C_2$-$C_{10}$alkynyl, $C_3$-$C_{10}$cycloalkynyl, aryl and aryl$C_1$-$C_{10}$alkyl, heteroaryl and heteroaryl$C_1$-$C_{10}$alkyl, $C_1$-$C_{10}$alkyloxy, $C_3$-$C_{10}$cycloalkyloxy and wherein amino, alkanoic acid, alkanoic salt, alkyloxycarbonyl, alkyl, haloalkyl, alkylamino, cycloalkyl, alkenyl, cycloalkenyl, alkynyl, cycloalkynyl, aryl, arylalkyl, heteroaryl, heteroarylalkyl, alkyloxy and cycloalkyloxy in each occurrence may be optionally substituted, for example further substituted with one or more of halo, hydroxyl, amino, nitro, carboxylic acid. In an embodiment, the optional substitution may be one or more functional groups selected from halo, alkyl, formyl, amino, thiol and thione. The optional substituents may include salts of the functional groups, for example carboxylate salts. In another embodiment, the optional substitution may be one or more functional groups selected from amino, thiol and thione.

In another embodiment, the one or more organic ligands of the MOFs can be selected from a compound of Formula 1(a):

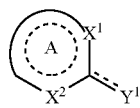

Formula 1(a)

wherein

A is a 5- or 6-membered aryl, heteroaryl or heterocyclic ring, which is optionally substituted with one or more substituents and optionally fused with one or more aryl or heteroaryl rings, wherein the dotted lines represents one or more optional double bonds;

$Y^1$ is selected from S or SH, wherein the dotted line represents a double bond when $Y^1$ is S or is absent when $Y^1$ is SH;

$X^1$ is selected from the group consisting of N, NH, O, and S;

$X^2$ is selected from the group consisting of N, $NR^5$, O, S, $CR^6$ and $CR^7R^8$;

$R^5$ is selected from the group consisting of hydrogen, amino, $C_1$-$C_{10}$alkyl, $C_2$-$C_{10}$alkenyl, $C_2$-$C_{10}$alkynyl, aryl and heteroaryl, in which each amino, alkyl, alkenyl, alkynyl, aryl or heteroaryl group may be optionally substituted; and $R^6$, $R^7$ and $R^8$, are each independently selected from the group consisting of hydrogen, halo, amino, thiol, thione, $C_1$-$C_{10}$alkyl, $C_2$-$C_{10}$alkenyl, $C_2$-$C_{10}$alkynyl, aryl and heteroaryl, in which each amino, alkyl, alkenyl, alkynyl, aryl or heteroaryl group may be optionally substituted.

In one embodiment, $Y^1$ is SH. In another embodiment, $X^1$ is selected from the group consisting of N, NH, and S. In another embodiment, $X^1$ is selected from the group consisting of N and S. In another embodiment, $X^1$ and $X^2$ are each independently selected from the group consisting of S, N and NH.

In another embodiment, $X^1$ is N. In another embodiment, $X^2$ is N. In another embodiment, $Y^1$ is SH.

Ring A may be aromatic, heteroaromatic or partially unsaturated. For example, ring A may contain one or more double bonds between ring atoms. Ring A may also contain one or more optional substituents and optional fused groups. In another embodiment, A is a 5 or 6 membered heteroaryl or heterocyclic ring.

In another embodiment, the one or more organic ligands of the MOFs can be selected from a heterocyclic compound of Formula 1(a)(i):

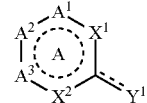

Formula 1(a)(i)

wherein

A, $Y^1$, X and $X^2$ are defined according to Formula 1(a) as described above; $A^1$, $A^2$ and $A^3$ are each independently selected from the group consisting of C=O, C=S, N, $NR^{13}$, O, S, $SO_2$, $CR^{14}$, $CR^{15}R^{16}$;

$R^{13}$ is selected from the group consisting of hydrogen, amino, $C_1$-$C_{10}$alkyl, $C_2$-$C_{10}$alkenyl, $C_2$-$C_{10}$alkynyl, aryl and heteroaryl, in which each amino, alkyl, alkenyl, alkynyl, aryl or heteroaryl group may be optionally substituted; and $R^{14}$, $R^{15}$ and $R^{16}$, are each independently selected from the group consisting of hydrogen, halo, amino, thiol, thione, $C_1$-$C_{10}$alkyl, $C_2$-$C_{10}$alkenyl, $C_2$-$C_{10}$alkynyl, aryl and heteroaryl, in which each amino, alkyl, alkenyl, alkynyl, aryl or heteroaryl group may be optionally substituted, and optionally two of $R^{13}$, $R^{14}$, $R^{15}$ and $R^{16}$, join together to form an optionally substituted aryl or heteroaryl ring fused to the A ring.

In an embodiment, $A^1$ and $A^3$ are $CR^{14}$. In another embodiment, $R^{14}$ is selected from amino and thiol. In another embodiment, $A^1$ and $A^3$ are each independently selected from C—SH and C—$NH_2$. In another embodiment, $A^1$ and $A^3$ are C—SH. In another embodiment, $Y^1$ is SH. In another embodiment, X and $X^2$ are N, In another embodiment, $A^2$ is N.

Some specific examples of compounds of Formula 1(a)(i) are provided as follows:

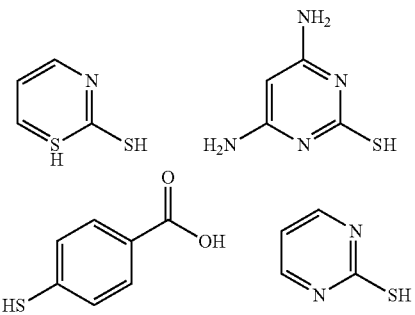

In another embodiment, the one or more organic ligands of the MOFs can be selected from a compound of Formula 1(a)(ii)

Formula 1(a)(ii)

wherein

A ring is an optionally substituted 5-membered heterocyclic ring, wherein the dotted lines represent one or more optional double bonds;

$X^1$, $X^2$ and $Y^1$ are defined according to Formula 1(a) as described above;

$A^1$ and $A^2$ are each independently selected from the group consisting of C=O, C=S, N, $NR^{13}$, O, S, $SO_2$, $CR^{14}$ and $CR^{15}R^{16}$; and are optionally joined together to form an optionally substituted aryl, heteroaryl or heterocyclic ring J that is fused to the A ring;

$R^{13}$ is selected from the group consisting of hydrogen, amino, $C_1$-$C_{10}$alkyl, $C_2$-$C_{10}$alkenyl, $C_2$-$C_{10}$alkynyl, aryl and heteroaryl, in which each amino, alkyl, alkenyl, alkynyl, aryl or heteroaryl group may be optionally substituted; and $R^{14}$, $R^{15}$ and $R^{16}$, are each independently selected from the group consisting of hydrogen, halo, amino, thiol, thione, $C_1$-$C_{10}$alkyl, $C_2$-$C_{10}$alkenyl, $C_2$-$C_{10}$alkynyl, aryl and heteroaryl, in which each amino, alkyl, alkenyl, alkynyl, aryl or heteroaryl group may be optionally substituted, and optionally two of $R^{13}$, $R^{14}$, $R^{15}$ and $R^{16}$, join together to form an optionally substituted aryl or heteroaryl ring fused to the A ring.

Some specific examples of compounds of Formula 1(a)(ii) are provided as follows:

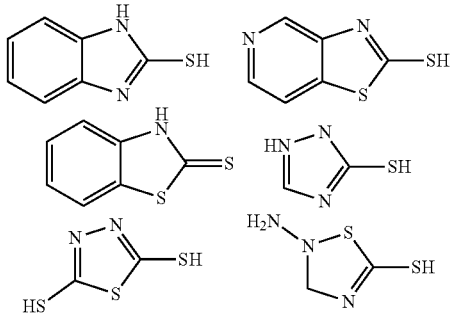

In another embodiment, the one or more organic ligands of the MOFs can be selected from a compound of Formula 1(a)(iii):

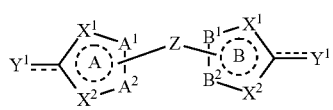

Formula 1(a)(iii)

wherein each A and B ring is an independent optionally substituted 5 membered heterocyclic ring, wherein the dotted lines represent one or more optional double bonds;

each $X^1$, $X^2$ and $Y^1$ are each independently defined according to Formula 1(a) as described above;

each $A^1$, $A^2$, $B^1$ and $B^2$, are independently selected from the group consisting of C=O, C=S, N, $NR^{13}$, O, S, $SO_2$, $CR^{14}$ and $CR^{15}R^{16}$.

$R^{13}$ is selected from the group consisting of hydrogen, amino, $C_1$-$C_{10}$alkyl, $C_2$-$C_{10}$alkenyl, $C_2$-$C_{10}$alkynyl, aryl and heteroaryl, in which each amino, alkyl, alkenyl, alkynyl, aryl or heteroaryl group may be optionally substituted; and $R^{14}$, $R^{15}$ and $R^{16}$, are each independently selected from the group consisting of hydrogen, halo, amino, thiol, thione, $C_1$-$C_{10}$alkyl, $C_2$-$C_{10}$alkenyl, $C_2$-$C_{10}$alkynyl, aryl and heteroaryl, in which each amino, alkyl, alkenyl, alkynyl, aryl or heteroaryl group may be optionally substituted;

Z is selected from the group consisting of C=O, C=S, N, O, S, $SO_2$, S—S, $C_1$-$C_{10}$alkyl, $C_2$-$C_{10}$alkenyl, $C_2$-$C_{10}$alkynyl; and wherein at least one $A^1$ or $A^2$ and $B^1$ or $B^2$ is selected from the group consisting of $NR^{13}$, $CR^{14}$ and $CR^{15}R^{16}$, and at least one of $R^{13}$, $R^{14}$, $R^{15}$ and $R^{16}$, represents a bond to Z.

Some specific examples of compounds of Formula 1(a)(iii) are provided as follows:

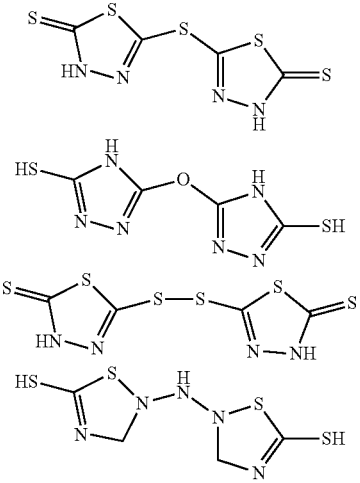

In another embodiment, the one or more organic ligands of the MOFs can be selected from a compound of Formula 1(b):

Formula 1(b)

wherein

A ring is an optionally substituted 5 membered heterocyclic ring, wherein the dotted lines represent one or more optional double bond;

$X^1$, $X^2$ and $X^3$ are defined according to Formula 1 as described above;

$A^1$ and $A^2$ are each independently selected from the group consisting of C=O, C=S, N, $NR^{13}$, O, S, $SO_2$, $CR^{14}$ and $CR^{15}R^{16}$; and are optionally joined together to form an optionally substituted aryl, heteroaryl or heterocyclic ring J that is fused to the A ring;

$R^{13}$ is selected from the group consisting of hydrogen, amino, $C_1$-$C_{10}$alkyl, $C_2$-$C_{10}$alkenyl, $C_2$-$C_{10}$alkynyl, aryl and heteroaryl, in which each amino, alkyl, alkenyl, alkynyl, aryl or heteroaryl group may be optionally substituted; and $R^{14}$, $R^{15}$ and $R^{16}$, are each independently selected from the group consisting of hydrogen, halo, amino, thiol, thione, $C_1$-$C_{10}$alkyl, $C_2$-$C_{10}$alkenyl, $C_2$-$C_{10}$alkynyl, aryl and heteroaryl, in which each amino, alkyl, alkenyl, alkynyl, aryl or heteroaryl group may be optionally substituted, and optionally two of $R^{13}$, $R^{14}$, $R^{15}$ and $R^{16}$, join together to form an optionally substituted aryl or heteroaryl ring fused to the A ring.

It will be appreciated that any of the embodiments described above for Formula 1 may also provide embodiments for any of Formulae 1(a)(i)-(iii) or Formula 1(b).

The organic ligand compounds may exist as one or more stereoisomers. The various stereoisomers can include enantiomers, diastereomers and geometric isomers. Those skilled in the art will appreciate that one stereoisomer may be more active than the other(s). In addition, the skilled person would know how to separate such stereoisomers. Accordingly, the present disclosure comprises mixtures, individual stereoisomers, and optically active mixtures of the compounds described herein. Some specific examples of aryl, heteroaryl, and heterocyclic organic compounds suitable for use as organic ligands for MOFs are shown in Table 1 as follows:

TABLE 1

| Organic Ligand | Chemical Name | Chemical Structure |
|---|---|---|
| 1 | 2-mercapto-benzimidazole (MBI) | |
| 2 | 3a,4-dihydrothiazolo[4,5-c]pyridine-2-thiol | |
| 3 | benzo[d]thiazole-2(3H)-thione | |
| 4 | 1,2,4-triazole-3-thiol (TT) | |
| 5 | 2,5-dimercapto-1,3,4-thiadiazole (DMT) | |
| 6 | 2-amino,5-mercapto-1,2,4-thiadiazole (AMT) | |
| 7 | 5,5'-thiobis(1,3,4-thiadiazole)-2(3H)-thione (MP) | |
| 8 | 5-methyl-2-mercapto-1,3,4-thiadiazole | |
| 9 | 5-amino-2-mercapto-1,3,4-thiadiazole | |

TABLE 1-continued

| Organic Ligand | Chemical Name | Chemical Structure |
|---|---|---|
| 10 | 4-amino-5-phenyl-3-mercapto-1,2,4-triazole | |
| 11 | 5-mercapto-1-tetrazole-1H-acetic acid, sodium salt | |
| 12 | 4,6-diamino-2-mercaptopyrimidine | |
| 13 | 4-amino-2-mercaptopyrimidine | |
| 14 | 2,6-diamino-4-mercaptopyrimidine | |
| 15 | 9H-purine-8-thiol | |
| 16 | 1H-imidazo[4,5-b]pyrazine-2-thiol | |
| 17 | S-triazolo-[4,3-a]-pyridine-3-thione | |
| 18 | 2-mercapto-benzimidazole | |
| 19 | 2,5-dimercapto-1,3,4-thiadiazole | |

TABLE 1-continued

| Organic Ligand | Chemical Name | Chemical Structure |
|---|---|---|
| 20 | 1,2,4-triazole-3-thiol | |
| 21 | 3-amino-5-mercapto-1,2,4-triazole | |
| 22 | 2-mercaptopyrimidine | |
| 23 | 5,5'-dithiobis(1,3,4-thiadiazole)-2(3H)-thione | |
| 24 | 1H-benzotriazole | |
| 25 | 2-mercaptonicotinate, sodium salt | |
| 26 | 4-mercaptobenzoate, sodium salt | |
| 27 | 6-mercaptonicotinate, sodium salt | |
| 28 | 1,3,5-triazine-2,4,6-trithiol | |

Process for Preparing MOFs

The main goal in MOF synthesis is to establish the synthesis conditions that lead to defined inorganic building blocks without decomposition of the organic linker. At the same time, the kinetics of crystallization must be appropriate to allow nucleation and growth of the desired phase to take place.

The term conventional synthesis is usually applied to reactions carried out by conventional electric heating without any parallelization of reactions. The reaction temperature is one of the main parameters in the synthesis of MOFs, and two temperature ranges, solvothermal and nonsolvothermal, are normally distinguished, which dictate the kind of reaction setups that have to be used. Although a common definition of solvothermal reactions has not been established, we use the one by Rabenau, i.e., reactions taking place in closed vessels under autogenous pressure above the boiling point of the solvent. Accordingly, nonsolvothermal reactions take place below or at the boiling point under ambient pressure, which simplifies synthetic requirements. The latter reactions can further be classified as the ones at room-temperature or the ones taking place at elevated temperatures.

Some prominent MOFs have even been obtained at room temperature by just mixing the starting materials; these are, for example, MOF-5, MOF-74, MOF-177, HKUST-1 or ZIF-8. This method is sometimes termed as direct precipitation reaction and shows that the crystallization of some MOFs must take place on a short time-scale. Some of these MOFs, e.g. ZIF-8, show good thermal and chemical stabilities. Variation of the reaction temperature has a strong influence on the product formation and often more condensed/dense structures are observed at higher temperatures. An increase of reaction temperature is also necessary in some systems to attain suitable crystallinity and reaction rates, especially if kinetically more inert ions are used. Nevertheless, the temperature can also have a strong influence on the morphology of the crystals, and prolonged reaction times can even lead to the degradation of the MOF.

Normally MOF syntheses take place in a solvent and at temperatures ranging from room temperature to approximately 250° C. The energy is generally introduced using conventional electric heating, i.e., heat is transferred from a hot source, the oven, through convection. Alternatively, energy can also be introduced through other means, for example by an electric potential, electromagnetic radiation, mechanical waves (ultrasound), or mechanically. The energy source is closely related to the duration, pressure, and energy per molecule that is introduced into a system, and each of these parameters can have a strong influence on the product formed and its morphology.

Different methods can lead to new compounds that cannot be obtained otherwise. Furthermore, alternative routes can lead to compounds with different particle sizes and size distributions as well as morphologies that can have an influence on the material's properties.

WO2010058123 and EP1070538 disclose methods for hydrothermal preparation of MOFs. Similarly, WO20100076220 discloses a process for obtaining crystalline porous metal organic compounds in a liquid phase at elevated temperature.

Shorter reaction times with mild conditions are disclosed in EP1373277. This document describes a method for the hydrothermal preparation of zinc terephthalate framework with good yields, the method comprising the reaction of an admixture of a zinc salt with terephthalic acid. The method requires the presence of a base (triethylamine) and a lactam or a lactone solvent. However, even though the reaction time is shortened with respect to other methods, at least 3 hours of continuous stirring are needed to obtain a small quantity of MOF product.

Additionally, all known preparation processes require the obtained MOF crystal to be separated from the mother liquor and further dried to obtain the final MOF product.

A synthetic method of obtaining MOFs can utilize solvothermal conditions. This method typically provides the synthesis to be carried out in the presence of an organic solvent and at high temperature (up to 130° C. or more) for a relatively long time (from over 12 hours to several days).

General information on the synthesis of a series of MOF materials is reported in a number of publications, including Yaghi et al., Nature 402 (1999) 276-279; B. Chen, M. Eddaoudi, Yaghi et al. Science 291 (2001) 1021-1023; Yaghi et al, Science 295 (2002) 469-472; Yaghi et al., Nature 423 (2003) 705-714; Yaghi et al., Science 300 (2003) 1127-1129.

The synthetic procedure described in US2003/0004364 involves the use of inorganic zinc salt [$Zn(NO_3)_2.6H_2O$] as a precursor of the [$ZnO$]$^{6+}$ core and a ditopic carboxylate acid as organic linker dissolved in a solvent. The product is then crystallized by slowly diffusing a diluted base solution into the post-reaction mixture solution to initiate the crystallization or by transferring the solution to a closed vessel and heating to a predetermined high temperature (solvothermal method).

Another method (Huang, L.; Wang, H.; Chen, J.; Wang, Z.; Sun, J.; Zhao, D.; Yan, Y. Microporous Mesoporous Mater. 2003, 58, 105) may involve the use of [$Zn(NO_3)_2.6H_2O$], the corresponding ditopic carboxylate acid and an amine in an organic solvent, and stirring such mixture for several hours at room temperature.

Alternatively, a zinc salt $Zn(CH_3COO)_2.2H_2O$ may be used as a precursor of the [$Zn_4O$]$^{6+}$ core. (D. J. Tranchemontagne, J. R. Hunt, O. M. Yaghi, Tetrahedron, 2008, 64, 8553).

As described above, MOFs may also be formed by seeding with agents, for example, using silicon and titania nanoparticles or microspheres (WO2011/133999, PCT/AU2010/001056), formed by flow chemistry processes ("Versatile, High Quality and Scalable Continuous Flow Production of Metal-Organic Frameworks", Rubio-Martinez et al, Scientific Reports, published online 25 Jun. 2014), or be modified by post-synthetic processes, for example using ligand exchange processes ("Postsynthetic ligand exchange for the synthesis of benzotriazole-containing zeolitic imidazolate framework", Jiang et al, Chem. Commun, published online 2 Mar. 2015).

Compositions and Formulations

Corrosion inhibiting compositions are provided comprising at least one corrosion inhibitor selected from a metal organic framework (MOF). The MOF may be any one or more MOFs as described herein. The compositions are suitable for use and application to various substrates, such as metal substrates, and for example can be provided as coating compositions. The compositions may include one or more other additives or corrosion inhibiting agents suitable for particular use with a type of substrate.

An advantage of the MOFs is that they can provide corrosion inhibiting properties without being problematically reactive with components of compositions. For example, the MOFS may be used in epoxy resin compositions without problematically reacting with the epoxy resins and retaining corrosion inhibiting properties.

Another advantage for some MOFs is that they may provide particles that are substantially white in colour or pigmentation. It will be appreciated that substantially white in colour or pigmentation refers to MOFs that may be white, ivory, cream, bone, beige and grey. The MOFs may therefore be used in coating compositions without the need for application of additional primer or enamel coats. The MOFs may provide both pigmentation and corrosion inhibiting properties. The MOFs may provide compositions that allow application of a single coating or layer of the composition to be applied. In one embodiment, the MOFs have a lighter or substantially white pigmentation. In another embodiment, the organic ligands and/or metals for preparing the MOFs are selected to form MOFs that have a lighter or substantially white pigmentation. An example of MOFs that can be obtained as white pigmented powders or particles are MOFs comprising a metal selected from at least one of lanthanum, yttrium and zinc. In one embodiment, an organic ligand for a white pigmented MOF may be selected from an optionally substituted benzimidazole, triadiazole, and triazole. More specific examples of ligands for forming white pigmented MOFs may include 1H-benzimidazole, 2-amino-5-mercapto-1,2,4-triadiazole, 1,2,4-triazole-3-thiol, and benzotriazole.

The corrosion inhibiting composition can be a coating composition comprising a film-forming organic polymer. It will be appreciated that a film-forming organic polymer is an organic polymer capable of forming a film upon application to a metal surface. The coating composition may be a paint composition. The coating composition may comprise one or more resins, for example epoxy based resins. The coating composition may be a paint composition, for example an epoxy resin based paint composition.

The coating composition may be a powder coating composition, for example a powder coating composition suitable for use in powder coating of various metal substrates including aluminium alloys as described herein or steels.

The coating composition may be a spray composition.

The coating compositions can be applied to a substrate, in either a wet or "not fully cured" condition that dries or cures over time, that is, solvent evaporates. The coatings can dry or cure either naturally or by accelerated means, for example an ultraviolet light cured system to form a film or "cured" paint. The coatings can also be applied in a semi or fully cured state, such as an adhesive.

The compositions may include a list of ingredients, and/or components, and can also include a list of instructions for preparing and mixing together the ingredients, and/or components to make a coating composition.

It will be appreciated that the compositions can include one or more additives, such as pigments, fillers and extenders. Examples of suitable additives with which the corrosion inhibitors described herein can be combined include, for example, binders, solvents, pigments (including soluble or non-soluble extenders, fillers, corrosion-inhibiting pigments, and the like), solvents, additives (e.g., curing agents, surfactants, dyes, amino acids and the like), and so forth. Note that some additives can also properly be considered a pigment and vice versa (e.g., matting agents). More specifically, these "additives" include, but are not limited to, glycine, arginine, methionine, and derivatives of amino acids, such as methionine sulfoxide, methyl sulfoxide, and iodides/iodates, gelatin and gelatin derivatives, such as animal and fish gelatins, linear and cyclic dextrins, including alpha and beta cyclodextrin, triflic acid, triflates, acetates, talc, kaolin, organic-based ionic exchange resins, such as organic-based cationic and anionic exchange resins, organic-based ionic exchange resins, such as organic-based cationic and anionic exchange resins, organic-based ionic exchange resins that have been pre-exchanged or reacted with the salts, oxides, and/or mixed oxides of rare earth material, and metal sulfates, such as sulfates of rare earth materials, magnesium sulfate, calcium sulfate (anhydrous and hydrated forms), strontium sulfate, barium sulfate, and the like.

It will be appreciated that the compositions may comprise, or consist of any one or more of the components or additives described herein.

The compositions may also include other additives such as rheology modifiers, fillers, tougheners, thermal or UV stabilizers, fire retardants, lubricants, surface active agents.

The additive(s) are usually present in an amount of less than about 10% based on the total weight of the activation treatment or the combination of solvent(s), agent(s) and additive(s). Examples include:

(a) rheology modifiers such as hydroxypropyl methyl cellulose (e.g. Methocell 311, Dow), modified urea (e.g. Byk 411, 410) and polyhydroxycarboxylic acid amides (e.g. Byk 405);

(b) film formers such as esters of dicarboxylic acid (e.g. Lusolvan FBH, BASF) and glycol ethers (e.g. Dowanol, Dow);

(c) wetting agents such as fluorochemical surfactants (e.g. 3M Fluorad) and polyether modified poly-dimethyl-siloxane (e.g. Byk 307, 333);

(d) surfactants such as fatty acid derivatives (e.g. Bermadol SPS 2543, Akzo) and quaternary ammonium salts;

(e) dispersants such as non-ionic surfactants based on primary alcohols (e.g. Merpol 4481, Dupont) and alkylphenol-formaldehyde-bisulfide condensates (e.g. Clariants 1494);

(f) anti foaming agents;

(g) anti corrosion reagents such as phosphate esters (e.g. ADD APT, Anticor C6), alkylammonium salt of (2-benzothiazolythio) succinic acid (e.g. Irgacor 153 CIBA) and triazine dithiols;

(h) stabilizers such as benzimidazole derivatives (e.g. Bayer, Preventol BCM, biocidal film protection);

(i) leveling agents such as fluorocarbon-modified polymers (e.g. EFKA 3777);

(j) pigments or dyes such as fluorescents (Royale Pigment and chemicals);

(k) organic and inorganic dyes such as fluoroscein; and (l) Lewis acids such as lithium chloride, zinc chloride, strontium chloride, calcium chloride and aluminium chloride.

(m) Suitable flame retardants which retard flame propagation, heat release and/or smoke generation which may be added singularly or optionally include:

Phosphorus derivatives such as molecules containing phosphate, polyphosphate, phosphites, phosphazine and phosphine functional groups, for example, melamine phosphate, dimelamine phosphate, melamine polyphosphate, ammonia phosphate, ammonia polyphosphate, pentaerythritol phosphate, melamine phosphite and triphenyl phosphine.

Nitrogen containing derivatives such as melamine, melamine cyanurate, melamine phthalate, melamine phthalimide, melam, melem, melon, melam cyanurate, melem cyanurate, melon cyanurate, hexamethylene tetraamine, imidazole, adenine, guanine, cytosine and thymine.

Molecules containing borate functional groups such as ammonia borate and zinc borate.

Molecules containing two or more alcohol groups such as pentaerythritol, polyethylene alcohol, polyglycols and carbohydrates, for example, glucose, sucrose and starch.

Molecules which endothermically release non-combustible decomposition gases, such as, metal hydroxides, for example, magnesium hydroxide and aluminum hydroxide.

Expandable graphite.

EXAMPLES

In order that the present disclosure may be more clearly understood, embodiments of the disclosure are described in further detail below by reference to the following non-limiting experimental materials, methodologies and examples.

Preparation of MOFs

General Procedure for the Preparation of MOFs from $M^{x+}(NO_3)_x$+2-Mercaptobenzimidazole (MBI—Compound 1)

7.4 g (49.4 mMol) of MBI was added to a 400 ml 90:10 solution of MeOH:DMF. Followed by a further 200 ml solution of the 90:10 MeOH:DMF containing dissolved 16.4 mMol of the metal nitrate (i.e., a mole ratio of 3:1:ligand: metal). This mixture was stirred for one hour at a temperature between 60 and 80° C. The stirring was stopped and ~1 ml of triethylamine was added as a catalyst for the formation of the coordination polymer. The heat was maintained for 24 hours. After 24 hours a fine precipitate was formed.

The resulting precipitate was collected by filtration and then washed with methanol three times. The FTIR spectrum was then collected and if the DMF amide peak at 1649 cm$^{-1}$ was still present washing was continued until the peak disappears. The X-ray diffraction pattern and the TGA profile of the precipitates was then obtained.

Example 1

$Zn(NO_3)_2 \cdot 6H_2O$+MBI was prepared according to the general process described above.

Example 2

$Ce(NO_3)_2 \cdot 6H_2O$+MBI was prepared according to the general process described above.

Example 3

$Pr(NO_3)_3 \cdot 6H_2O$+MBI was prepared according to the general process described above.

Example 4

$La(NO_3)_3 \cdot 6H_2O$+MBI was prepared according to the general process described above.

Example 5

$Y(NO_3)_3 \cdot 6H_2O$+MBI was prepared according to the general process described above.

General Procedure for the Preparation of MOFs from $M^{x+}(NO_3)_2$+1,2,4-Triazole-3-Thiol (TT—Compound 4)

5 g (49.4 mMol) of TT was added to a 400 ml 90:10 solution of MeOH:DMF. Followed by a further 200 ml solution of the 90:10 MeOH:DMF containing dissolved 16.4 mMol of the metal nitrate (i.e., a mole ratio of 3:1:ligand: metal). This mixture was stirred for one hour at a temperature of between 60 and 80° C. The stirring was stopped and ~1 ml of triethylamine was added as a catalyst for the formation of the coordination polymer. The heat was maintained for 24 hours. After 24 hours a fine precipitate was formed.

The resulting precipitate was collected by filtration and then washed with methanol three times. The FTIR spectrum was then collected and if the DMF amide peak at 1649 cm-1 was still present washing was continued until the peak disappears.

The X-ray diffraction pattern and the TGA profile of the precipitate were obtained.

Example 6

Zn(NO$_3$)$_2$.6H$_2$O+TT was prepared according to the general process described above.

Example 7

Ce(NO$_3$)$_2$.6H$_2$O+TT was prepared according to the general process described above.

Example 8

Pr(NO$_3$)$_3$.6H$_2$O+TT was prepared according to the general process described above.

Example 9

La(NO$_3$)$_3$.6H$_2$O+TT was prepared according to the general process described above.

Example 10

Y(NO$_3$)$_3$.6H$_2$O+TT was prepared according to the general process described above.

General Procedure for the Preparation of MOFs from M$^{x+}$(NO$_3$)$_2$+2,5-Dimercapto-1,3,4-Thiadiazole (DMT—Compound 5)

7.43 g (49.4 mMol) of DMT was added to a 400 ml 90:10 solution of MeOH:DMF. Followed by a further 200 ml solution of the 90:10 MeOH:DMF containing dissolved 16.4 mMol of the metal nitrate (i.e., a mole ratio of 3:1:ligand:metal). This mixture was stirred for one hour at a temperature between 60 and 80 C. The stirring was stopped and ~1 ml of triethylamine was added as a catalyst for the formation of the coordination polymer. The heat was maintained for 48 hours. After 24 hours a fine precipitate was formed.

The resulting precipitate was collected by filtration and then washed with methanol three times. The FTIR spectrum was then collected and if the DMF amide peak at 1649 cm$^1$ was still present washing was continued until the peak disappears. The X-ray diffraction pattern and the TGA profile of the precipitates were then obtained.

Example 11

Zn(NO$_3$)$_2$.6H$_2$O+DMT was prepared according to the general process described above.

Example 12

Ce(NO$_3$)$_2$.6H$_2$O+DMT was prepared according to the general process described above.

Example 13

Pr(NO$_3$)$_3$.6H$_2$O+DMT was prepared according to the general process described above.

Example 14

La(NO$_3$)$_3$.6H$_2$O+DMT was prepared according to the general process described above.

Example 15

Y(NO$_3$)$_3$.6H$_2$O+DMT was prepared according to the general process described above.

General Procedure for the Preparation of MOFs from M$^{x+}$(NO$_3$)$_x$+2-Amino-5-Mercapto-1,2,4-Triazole (AMT—Compound 6)

5.7 g (49.4 mMol) of AMT was added to a 400 ml 90:10 solution of MeOH:DMF. Followed by a further 200 ml solution of the 90:10 MeOH:DMF containing dissolved 16.4 mMol of the metal nitrate (i.e., a mole ratio of 3:1:ligand:metal). This mixture was stirred for one hour at a temperature between 60 and 80° C. The stirring was stopped and ~1 ml of triethylamine was added as a catalyst for the formation of the coordination polymer. The heat was maintained for 24 hours. After 24 hours a fine precipitate was formed.

The resulting yellow precipitate was collected by filtration and then washed with methanol three times. The FTIR spectrum was then collected and if the DMF amide peak at 1649 cm$^1$ was still present washing was continued until the peak disappears. The X-ray diffraction pattern and the TGA profile of the precipitates were then obtained.

Example 16

Zn(NO$_3$)$_2$.6H$_2$O+AMT was prepared according to the general process described above.

Example 17

Ce(NO$_3$)$_2$.6H$_2$O+AMT was prepared according to the general process described above.

Example 18

Pr(NO$_3$)$_3$.6H$_2$O+AMT was prepared according to the general process described above.

Example 19

La(NO$_3$)$_3$.6H$_2$O+AMT was prepared according to the general process described above.

Example 20

Y(NO$_3$)$_3$.6H$_2$O+AMT was prepared according to the general process described above.

General Procedure for the Preparation of MOFs from M$^{x+}$(NO$_3$)$_x$+2-Mercaptopyrimidine (MP—Compound 7)

The general procedures for preparation of the compounds are as described above.

Example 21

Zn(NO$_3$)$_3$.6H$_2$O+MP was prepared according to the general process described above.

Example 22

Pr(NO$_3$)$_3$.6H$_2$O+MP was prepared according to the general process described above.

General Procedure for the Preparation of MOFs from M$^{x+}$(NO$_3$)$_x$N$^y$(NO$_3$)$_y$+2-Mercaptobenzimidazole (MBI—Compound 1)

The general procedures for preparation of the compounds are as described above.

Example 23

Pr(NO$_3$)$_3$.Ce(NO$_3$)$_3$+MBI was prepared according to the general process described above.

Example 24

Pr(NO$_3$)$_3$.La(NO$_3$)$_3$+MBI was prepared according to the general process described above.

General Procedure for the Preparation of MOFs from M$^{x+}$(NO$_3$)$_x$.N$^{y+}$(NO$_3$)$_y$+2-Mercaptobenzimidazole (MBI—Compound 1)

The general procedures for preparation of the compounds are as described above.

Example 25

Zn(NO$_3$)$_3$.Ce(NO$_3$)$_3$+MBI was prepared according to the general process described above.

Example 26

Zn(NO$_3$)$_3$.Pr(NO$_3$)$_3$+MBI was prepared according to the general process described above.

General Procedure for the Preparation of MOFs from M$^{x+}$(NO$_3$)$_x$.N$^{y+}$(NO$_3$)$_y$+1,2,4-Triazole-3-Thiol (TT—Compound 4)

3.5 g (34.6 mMol) of TT was dissolved in a 400 ml solution of 90:10 solution of MeOH:DMF, 2.5 g of Pr(NO$_3$)$_3$ (5.71 mMol) and 1.7 g Zn(NO$_3$)$_3$ (5.71 mMol) were dissolved in separate 100 ml solutions of the 90:10 solution of MeOH:DMF solution. The metal solutions were then added to the TT solution and the mixture was heated to 60-80° C. with stirring for the first hour. The stirring was then stopped and 1 ml of TEA was added. Overnight a very pale green deposit formed on the inner surface of the reaction vessel. The deposit and a precipitate was collected by filtration and the solid material was washed with methanol.

Example 27

Zn(NO$_3$)$_3$.Ce(NO$_3$)$_3$+TT was prepared according to the general process described above.

Example 28

Zn(NO$_3$)$_3$.La(NO$_3$)$_3$+TT was prepared according to the general process described above.

Example 29

Zn(NO$_3$)$_3$.Pr(NO$_3$)$_3$+TT was prepared according to the general process described above.

Example 30

Zn(NO$_3$)$_3$.Y(NO$_3$)$_3$+TT was prepared according to the general process described above.

General Procedure for the Preparation of MOFs from M$^{x+}$(NO$_3$)$_x$.N$^{y+}$(NO$_3$)$_y$+2,5-Dimercapto-1,3,4-Thiadiazole (DMT—Compound 5)

The general procedures for preparation of the compounds are as described above.

Example 31

Zn(NO$_3$)$_3$.Ce(NO$_3$)$_3$+DMT was prepared according to the general process described above.

Example 32

Zn(NO$_3$)$_3$.La(NO$_3$)$_3$+DMT was prepared according to the general process described above.

Example 33

Zn(NO$_3$)$_3$.Pr(NO$_3$)$_3$+DMT was prepared according to the general process described above.

Example 34

Zn(NO$_3$)$_3$.Y(NO$_3$)$_3$+DMT was prepared according to the general process described above.

Corrosion Testing of MOFs on Metal Substrates

General Procedure for Preparation of Coated Metal Substrates

A 2-part epoxy coating was made by mixing Epikote 828 (3.0 g) and Aradur 450 hardener (1.8 g) in a "Thinky Mixer" for 2 minutes at 2000 rpm. A MOF (0.48 g) together with methyl ethyl ketone (MEK) solvent (0.5 g) was added to the epoxy coating after a "sweating" time of 60 minutes. The prepared coating was applied to a metal substrate immediately after the final mix and heated for 12 hours in a 40° C. oven. The coated metal substrate was baked at 80° C. for 30 minutes prior to being used either in Leaching tests or scribed for Neutral Salt Spray (NSS) tests.

Example 35

TT/epoxy combination was prepared according to the general procedure described above and coated on a ~3×5 inch AA2024 aluminium plate.

Example 36

LaTT/epoxy combination was prepared according to the general procedure described above and coated on a ~3×5 inch AA2024 aluminium plate.

Example 37

PrTT/epoxy combination was prepared according to the general procedure described above and coated on a ~3×5 inch AA2024 aluminium plate.

Example 38

ZnDMT/epoxy combination was prepared according to the general procedure described above and coated on a ~3×5 inch AA2024 aluminium plate.

Example 39

Zn(MP)/epoxy combination was prepared according to the general procedure described above and coated on a ~3×3 inch AA2024 aluminium plate.

General Procedure for Leaching Test

A MOF/epoxy coated metal substrate prepared according to the general procedure described above was exposed to 100 ml of 0.1 M NaCl solution contained inside a Perspex reservoir clamped to the surface of the coated metal substrate. At time periods of 1 day, 2 days, 3 days, 7 days, 14 days, 21 days, 28 days and 35 days, the salt solution was removed and replaced with fresh solution. The removed solution was analysed by Inductively Coupled Plasma Atomic Emission Spectroscopy (ICP-AES) for sulphur and metal species. The experiment was repeated three times and the average results of the three experiments were graphed (FIG. 1).

Example 40

Zn(MP)/epoxy coated aluminium metal substrate was prepared according to Example 39 and cumulative leaching of Zn(MP) from the aluminium metal substrate. The amount of Zn and S was determined by ICP-AES. FIG. 1 shows that the Zn(MP)/epoxy coated aluminium metal substrate leaches zinc and sulphur into the NaCl solution providing a corrosion resistant environment. This provides results supporting advantages that the MOFs in a coating composition can effectively be used in a protective coating compositions to prevent corrosion of the metal substrate without being problematically reactive with other components in the compositions. This also provides results supporting advantages that the MOFs are capable being used in film-forming compositions.

General procedure for Neutral Salt Spray Test (NSS)

Figure 2:
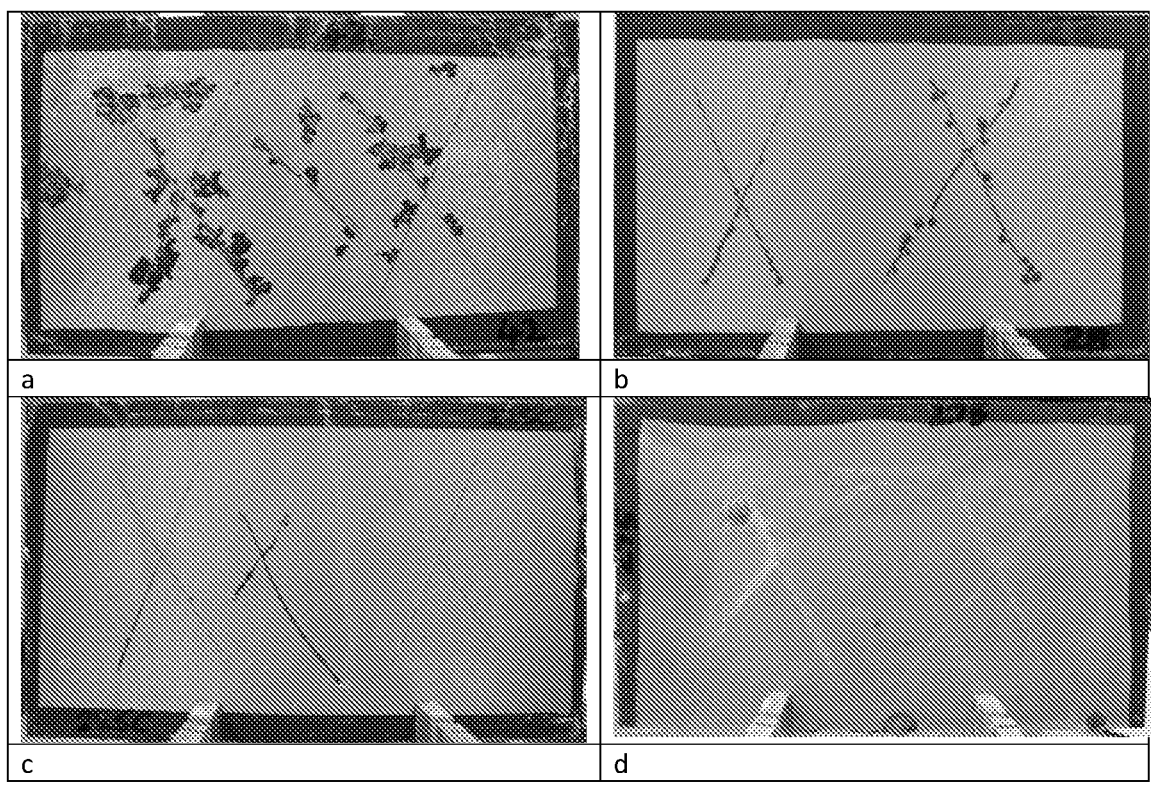
FIG. 2a is a photograph illustrating TT/epoxy coating on aluminium substrate after 12 weeks of exposure, according to an embodiment.
FIG. 2b is a photograph illustrating LaTT/epoxy coating on aluminium substrate after 12 weeks of exposure, according to an embodiment.
FIG. 2c is a photograph illustrating PrTT/epoxy coating on aluminium substrate after 12 weeks of exposure, according to an embodiment.
FIG. 2d is a photograph illustrating ZnDMT/epoxy coating on aluminium substrate after 12 weeks of exposure, according to an embodiment.

A MOF/epoxy coated metal substrate prepared according to the general procedure described above was scribed at 80° C. The coated metal substrates were then exposed to 5% salt spray at 35° C. for 12 weeks (2016 hours) according to ASTM B117. The coated metal substrates were removed, rinsed with deionised (DI) water and photographed at weekly intervals and then returned. FIG. 2 shows the results obtained for the NSS testing of various MOF/epoxy coated aluminium coated substrate.

Example 41

TT/epoxy coated aluminium metal substrate was prepared according to Example 35 and the subjected to NSS according to the general procedure described above. FIG. 2a shows that the TT/epoxy coating provides some corrosion inhibition of the aluminium substrate after 12 weeks of exposure.

Example 42

LaTT/epoxy coated aluminium metal substrate was prepared according to Example 36 and the subjected to NSS according to the general procedure described above. FIG. 2b shows that the LaTT/epoxy coating provides moderate corrosion inhibition of the aluminium substrate after 12 weeks of exposure. This provides results supporting advantages that the MOFs in a coating composition can effectively be used in a protective coating compositions to prevent corrosion of the metal substrate without being problematically reactive with other components in the compositions. This also provides results supporting advantages that the MOFs are capable being used in film-forming compositions.

Example 43

PrTT/epoxy coated aluminium metal substrate was prepared according to Example 37 and the subjected to NSS according to the general procedure described above. FIG. 2c shows that the PrTT/epoxy coating provides complete corrosion inhibition of the aluminium substrate after 12 weeks of exposure. This provides results supporting advantages that the MOFs in a coating composition can effectively be used in a protective coating compositions to prevent corrosion of the metal substrate without being problematically reactive with other components in the compositions. This also provides results supporting advantages that the MOFs are capable being used in film-forming compositions.

Example 44

ZnDMT/epoxy coated aluminium metal substrate was prepared according to Example 38 and the subjected to NSS according to the general procedure described above. FIG. 2d shows that the ZnDMT/epoxy coating provides moderate corrosion inhibition of the aluminium substrate after 12 weeks of exposure. This provides results supporting advantages that the MOFs in a coating composition can effectively be used in a protective coating compositions to prevent corrosion of the metal substrate without being problematically reactive with other components in the compositions. This also provides results supporting advantages that the MOFs are capable being used in film-forming compositions.

The invention claimed is:

1. A method of protecting a substrate from corrosion comprising applying a protective composition comprising a corrosion inhibitor to a surface of the substrate, wherein the corrosion inhibitor comprises a metal organic framework (MOF),
   wherein the MOF comprises metal ions or metal clusters coordinated to one or more organic ligands to form at least a one-, two- or three dimensional network, and wherein the one or more organic ligands are selected from the group consisting of optionally substituted aryl, heteroaryl or heterocyclic compounds, wherein each of the optionally substituted aryl, heteroaryl or heterocyclic compounds comprise at least one exocyclic sulphur group,
   wherein the metal ions or metal clusters of the MOFs are selected from at least one of rare earth metals or transition metals, and
   wherein the at least one rare earth metal or transition metal is selected from the group consisting of Zn, Pr, Ce, and combinations thereof.

2. The method of claim 1, wherein the substrate is a metal substrate.

3. The method of claim 2, wherein the metal substrate comprises a metal or alloy of aluminium.

4. The method of claim 1, wherein the one or more organic ligands are independently selected from an optionally substituted, optionally fused, 5- or 6-membered mono or bicyclic aryl, heteroaryl or heterocyclic compound comprising at least one exocyclic sulphur group selected from a thiol or thione.

5. The method of claim 1, wherein the one or more organic ligands comprising at least one exocyclic sulphur group are selected from a compound of Formula 1:

Formula 1

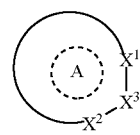

wherein
A is a 5- or 6-membered aryl, heteroaryl or heterocyclic ring, which is optionally substituted with one or more substituents and optionally fused with one or more aryl or heteroaryl rings, wherein the dotted lines represent an optional double bond;

$X^1$ is selected from the group consisting of N, $NR^1$, O, S, $CR^2$, and $CR^3R^4$;

$X^2$ is selected from the group consisting of N, $NR^5$, O, S, $CR^6$, and $CR^7R^8$;

$X^3$ is selected from the group consisting of N, $NR^9$, $CR^{10}$, and $CR^{11}R^{12}$;

$R^1$, $R^5$ and $R^9$, are each independently selected from hydrogen, amino, $C_1$-$C_{10}$alkyl, $C_2$-$C_{10}$alkenyl, $C_2$-$C_{10}$alkynyl, aryl and heteroaryl, in which each amino, alkyl, alkenyl, alkynyl, aryl or heteroaryl group is optionally substituted; and $R^2$, $R^3$, $R^4$, $R^6$, $R^7$, $R^8$, $R^{10}$, $R^{11}$ and $R^{12}$, are each independently selected from hydrogen, halo, amino, thiol, thione, $C_1$-$C_{10}$alkyl, $C_2$-$C_{10}$alkenyl, $C_2$-$C_{10}$alkynyl, aryl and heteroaryl, in which each amino, alkyl, alkenyl, alkynyl, aryl or heteroaryl group may be optionally substituted.

6. The method of claim 5, wherein $X^1$ is selected from the group consisting of N, NH, and S.

7. The method of claim 5, wherein $X^3$ is selected from the group consisting of N and $CR^{10}$, and $R^{10}$ is selected from the group consisting of thiol and thione.

8. The method of claim 5, wherein $X^1$ is N, $X^2$ is N, and $X^3$ is C—SH.

9. The method of claim 1, wherein the MOFs are in the form of solid particles, wherein the average diameter of the solid particles is 20 nm to 50 µm.

10. A method of protecting a substrate from corrosion comprising applying a protective composition comprising a corrosion inhibitor to a surface of the substrate, wherein the corrosion inhibitor comprises a metal organic framework (MOF), wherein the MOF comprises metal ions or metal clusters coordinated to one or more organic ligands to form at least a one-, two- or three dimensional network, and wherein the one or more organic ligands are selected from the group consisting of optionally substituted aryl, heteroaryl or heterocyclic compounds, wherein each of the optionally substituted aryl, heteroaryl or heterocyclic compounds comprise at least one exocyclic sulphur group, wherein the one or more organic ligands comprising at least one exocyclic sulphur group are selected from a compound of Formula 1:

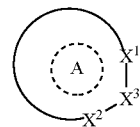

Formula 1 wherein

A is a 5- or 6-membered aryl, heteroaryl or heterocyclic ring, which is optionally substituted with one or more substituents and optionally fused with one or more aryl or heteroaryl rings, wherein the dotted lines represent an optional double bond; and wherein $X^1$ is N, $X^2$ is N, and $X^3$ is C—SH.

11. The method of claim 10, wherein the substrate is a metal substrate.

12. The method of claim 11, wherein the metal substrate comprises a metal or alloy of aluminium.

13. The method of claim 10, wherein the metal ions or metal clusters of the MOFs are selected from at least one of rare earth metals or transition metals.

14. The method of claim 10, wherein the at least one rare earth metal is selected from the group consisting of Zn, La, Pr, Ce, Co, Y, and any combination thereof.

15. The method of claim 14, wherein the at least one rare earth metal or transition metal is selected from the group consisting of Zn, Pr, Ce, and any combination thereof.

16. The method of claim 15, wherein the at least one rare earth metal or transition metal is Zn.

17. The method of claim 15, wherein the at least one rare earth metal or transition metal is Pr.

18. The method of claim 15, wherein the at least one rare earth metal or transition metal is Ce.

19. The method of claim 10, wherein the MOFs are in the form of solid particles.

20. The method of claim 10, wherein the MOFs have an average diameter of 20 nm to 50 µm.

\* \* \* \* \*